(12) United States Patent
Kubo et al.

(10) Patent No.: US 6,338,113 B1
(45) Date of Patent: Jan. 8, 2002

(54) MEMORY MODULE SYSTEM HAVING MULTIPLE MEMORY MODULES

(75) Inventors: Takashi Kubo; Kenichi Yasuda; Hisashi Iwamoto, all of Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/195,037

(22) Filed: Nov. 19, 1998

(30) Foreign Application Priority Data

Jun. 10, 1998 (JP) .......................................... 10-162000

(51) Int. Cl.[7] .............................................. G06F 12/02
(52) U.S. Cl. ........................ 711/105; 710/131; 713/324
(58) Field of Search ................................ 711/105, 170, 711/171, 172, 173; 710/131; 365/230.03; 713/323, 324

(56) References Cited

U.S. PATENT DOCUMENTS

| | | | |
|---|---|---|---|
| 6,028,781 A | * | 2/2000 | Vogley et al. ................. 365/52 |
| 6,070,217 A | * | 5/2000 | Connolly et al. ............ 710/131 |
| 6,078,515 A | * | 6/2000 | Nielsen et al. ................. 365/63 |

FOREIGN PATENT DOCUMENTS

| | | |
|---|---|---|
| JP | 5-102399 | 4/1993 |
| JP | 9-274527 | 10/1997 |

* cited by examiner

*Primary Examiner*—Hiep T. Nguyen
(74) *Attorney, Agent, or Firm*—McDermott, Will & Emery

(57) ABSTRACT

There are provided a memory controller, a plurality of memory modules, and an external data bus common to the plurality of memory modules. The plurality of memory modules each include a plurality of memory chips, a plurality of internal data buses connected between a corresponding memory chip and an input/output terminal, a logic chip, and a plurality of switch transistors each connected between a corresponding internal data bus and a corresponding input/output terminal to turn on/off in response to a control signal from the logic chip. The plurality of switch transistors in a memory module selected by the memory controller are turned on, and the plurality of switch transistors in the memory modules other than the selected memory module are turned off. Thus, the capacity of the memory modules may be increased while maintaining high-speed data transfer.

8 Claims, 21 Drawing Sheets

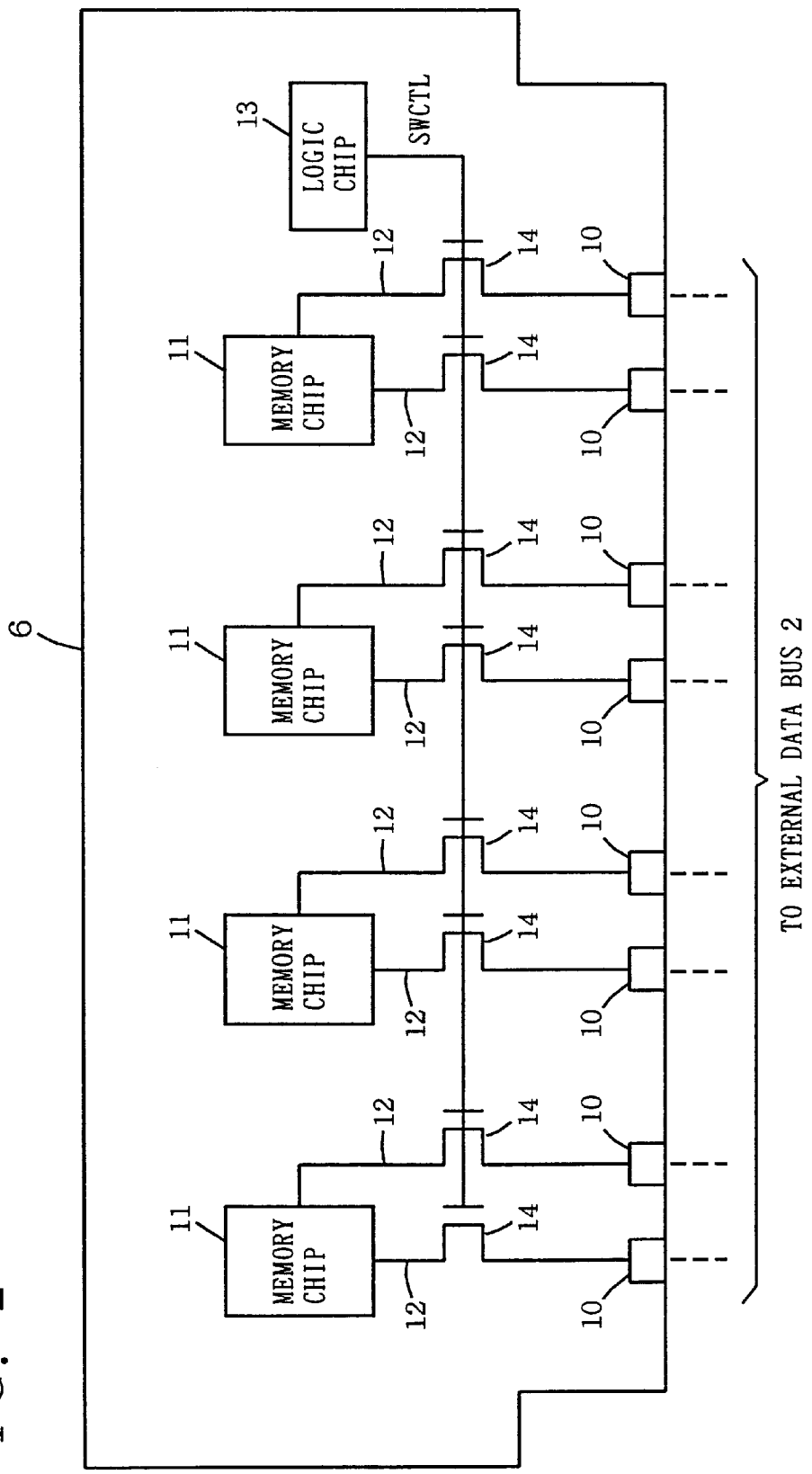
F I G. 2

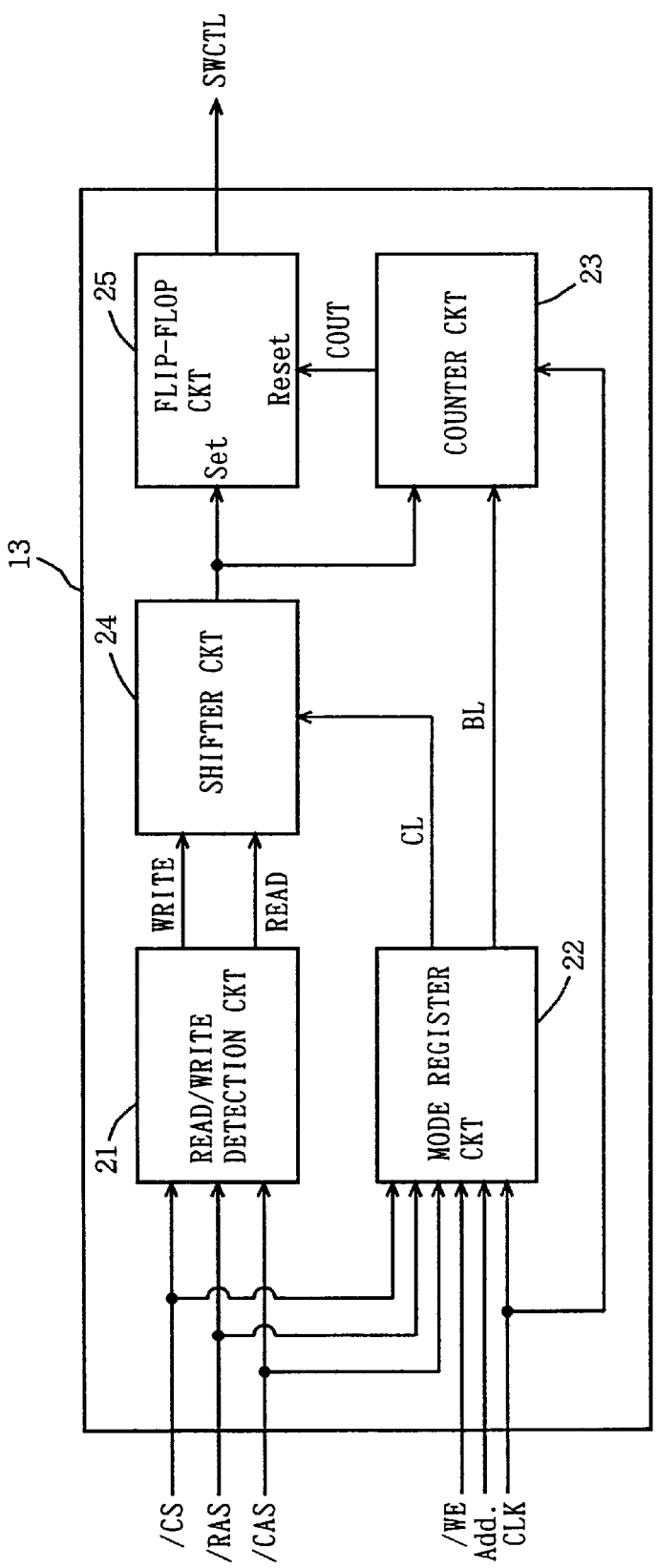
F I G. 3

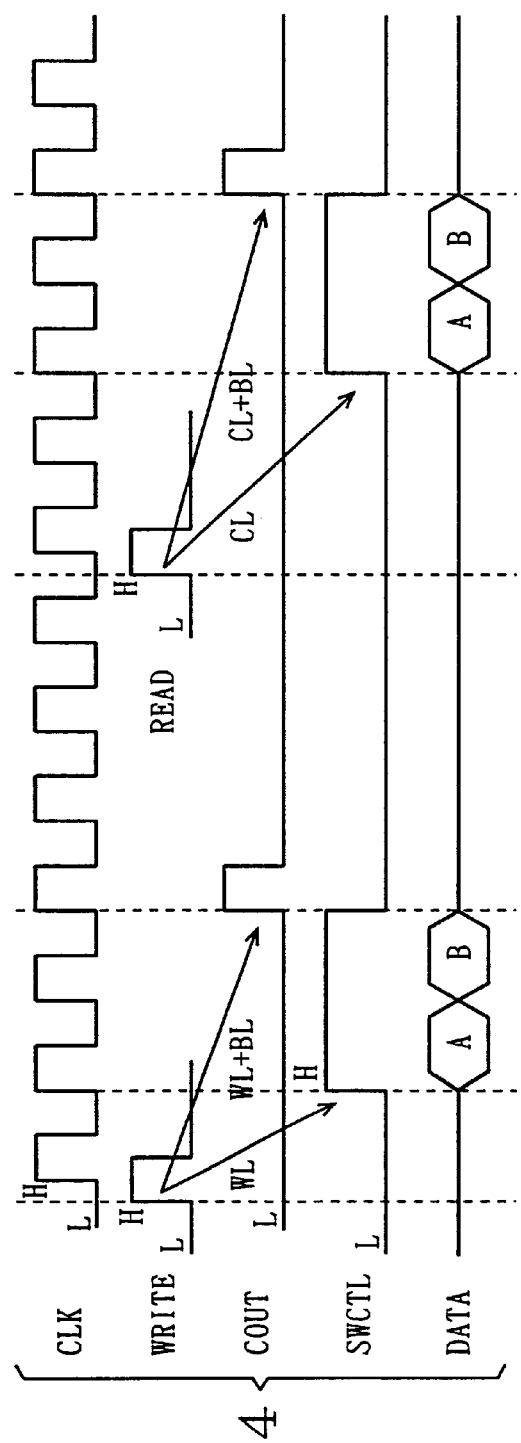
F I G. 4

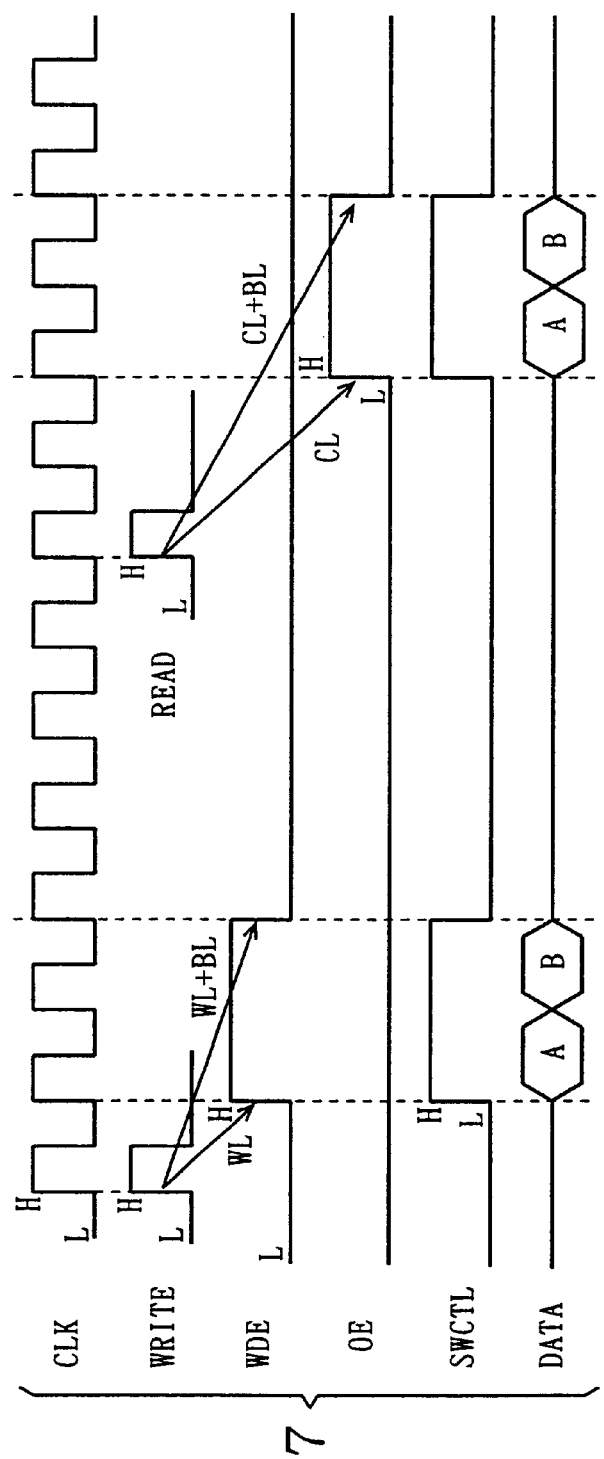
F I G. 7

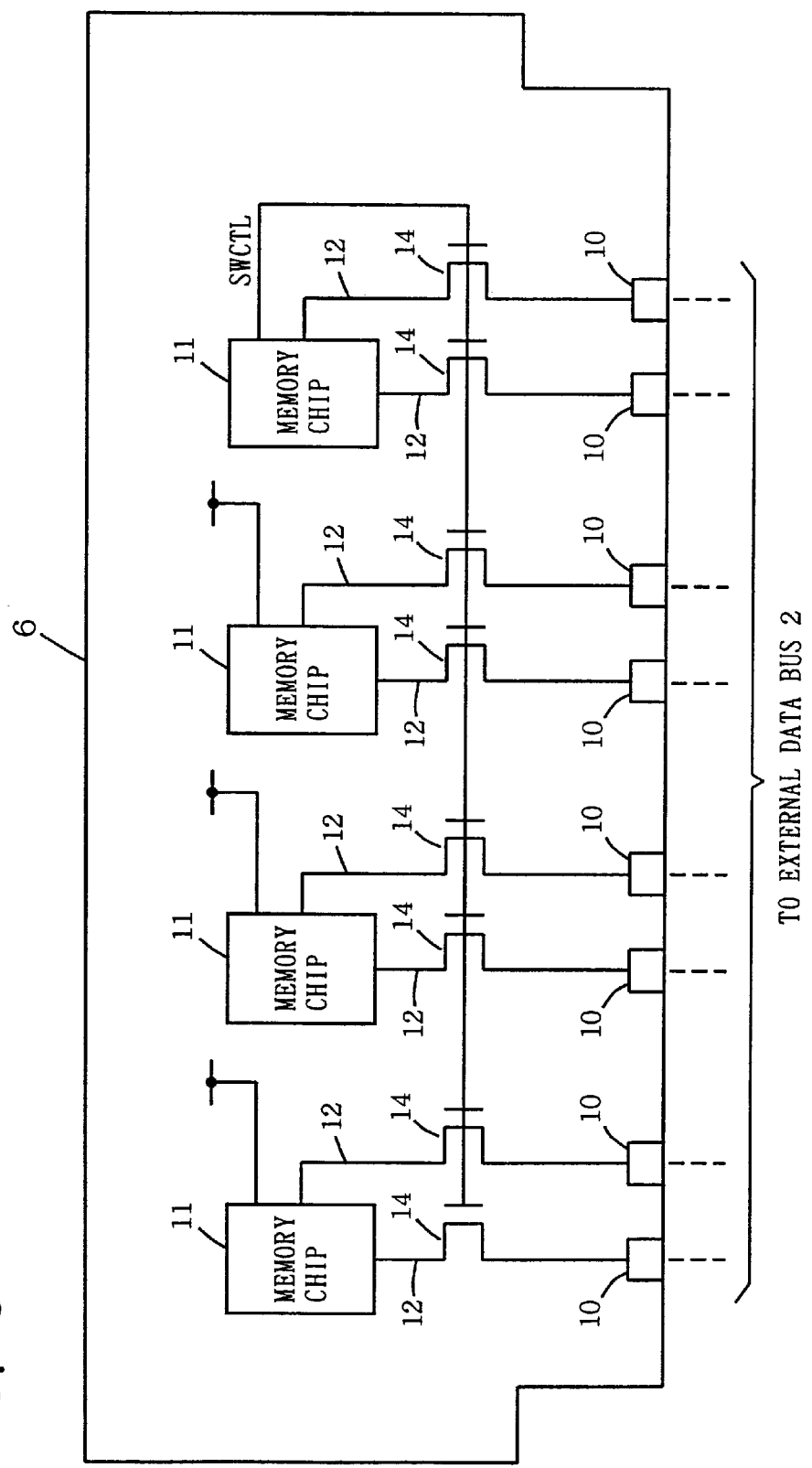
F I G. 8

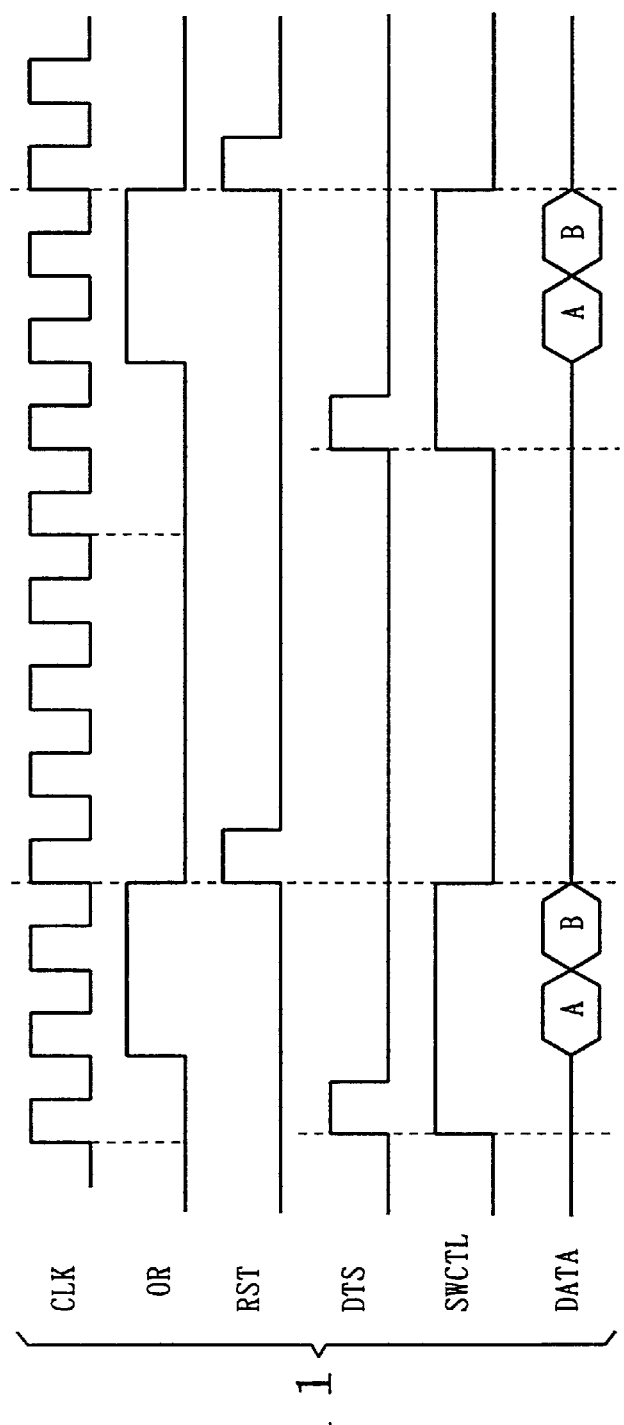
F I G. 11

MEMORY MODULE SYSTEM HAVING MULTIPLE MEMORY MODULES

BACKGROUND OF THE INVENTION

1. Field of the Invention

The present invention relates generally to memory module systems, and more specifically, to a memory module system having a plurality of memory modules.

2. Description of the Background Art

The main memory in a computer system such as personal computer and workstation is supplied on the basis of a memory module including a plurality of memory chips. In recent years, the scale of OS' or application software in the computer system has much grown, and the size of data has also increased by the introduction of three-dimensional CAD/image data, which greatly accelerates the growth of the scale of the main memory. In order to cope with the development, memory chips are further integrated to increase the capacity per a single memory module, or the number of memory modules connected to a single external data bus is increased.

As the number of memory modules connected to a single external data bus has increased as described above, the load of the external data bus increases as well, which impedes data transfer at a high speed. As a result, the number of memory modules connected to a single external data bus is necessarily limited.

SUMMARY OF THE INVENTION

The present invention is directed to a solution to the above-described problem, and it is an object of the present invention to provide a memory module system that permits high-speed data transfer to be maintained and the capacity of memory modules to be increased.

A memory module system according to the present invention includes a plurality of memory modules, a memory controller, and an external data bus. The memory controller selects any of the memory modules. The external data bus is common to the plurality of memory modules. The plurality of memory modules each include a printed circuit board, a plurality of memory chips, a plurality of internal data buses, and a plurality of first switching elements. The plurality of memory chips are mounted on the printed circuit board. The plurality of internal data buses corresponding to the plurality of memory chips are formed on the printed circuit board and each connected to a corresponding memory chip. The plurality of first switching elements corresponding to the plurality of internal data buses are provided on the printed circuit board and each connected between a corresponding internal data bus and the external data bus. The memory module system further includes a control circuit. The control circuit turns on the plurality of first switching elements in a memory module selected by the memory controller, while turns off the plurality of first switching elements in the memory modules other than the selected memory module.

As a result, only the selected memory module is connected to the external data bus. Thus, increase in the number of memory modules to be connected to the external data bus does not increases the load of the external data bus, which permits high speed data transfer to be maintained and the capacity of the memory modules to be increased.

The control circuit preferably includes a plurality of logic chips. The plurality of logic chips are provided corresponding to the plurality of memory modules, and each mounted on the printed circuit board in a corresponding memory module. The plurality of logic chips each turn on the plurality of first switching elements in a corresponding memory module if the memory controller selects the corresponding memory module, and otherwise turn off the plurality of first switching elements.

In the memory module system described above, since the plurality of logic chips are newly mounted on the printed circuit board in the memory modules, the specification of the existing memory chips does not have to be changed.

The memory controller preferably applies a command signal representing a writing or reading mode to the plurality of logic chips, each of which turns on the plurality of first switching elements in a corresponding memory module after a latency period since the command signal is received, and then turns off the plurality of first switching elements after passage of a burst length period since the plurality of switching elements are turned on.

Thus, time required for writing/reading data to/from a memory chip is equal to the time during which the plurality of first switching elements corresponding to the memory chip are turned on.

The control circuit preferably includes a plurality of logic circuits. The plurality of logic circuits are provided corresponding to a plurality of memory modules, each built inside at least one of a plurality of memory chips in a corresponding memory module, each turn on the plurality of first switching elements in a corresponding memory module when the memory controller selects the corresponding memory module, and otherwise turns off the plurality of first switching elements.

In the memory module system, since logic circuits are newly provided in a memory chip, new logic chips are not necessary on a memory module.

The memory controller preferably applies a command signal representing a writing or reading mode to the plurality of logic circuits, each of which turns on the plurality of first switching elements in a corresponding memory module after a latency period since the command signal is received, and then turns off the plurality of first switching elements after a burst length period since the plurality of first switching elements are turned on.

Thus, time required for writing/reading data to/from a memory chip is equal to the time during which the plurality of first switching elements corresponding to the memory chip are on.

The memory controller preferably applies a command signal representing a writing or reading mode to the plurality of logic circuits. The plurality of logic circuits each include a write driver enable generation circuit, an output enable generation circuit, and an OR circuit. The write driver enable generation circuit generates a write driver enable signal which is activated after a writing latency period since the command signal representing the writing mode is received, and is then inactivated after a burst length period since the activation. The output enable generation circuit generates an output enable signal which is activated after a column address strobe latency period since the command signal representing the reading mode is received, and is then inactivated after a burst length period since the activation. The OR circuit receives the write driver enable signal and the output enable signal. The plurality of first switching elements in each of the memory modules are each a transistor having a gate to receive the output signal of an OR circuit in a corresponding logic circuit.

In the memory module system described above, the command signal representing the writing or reading mode is applied to a plurality of logic circuits included in a memory module selected by the memory controller. In response to the command signal, the plurality of logic circuits apply, to the gate of each of the plurality of transistors, a signal which is activated after a latency period since receiving the command signal representing the writing or reading mode, and is then inactivated after a burst length period since the activation. As a result, during the period in which data is written/read to/from a memory chip, a plurality of transistors corresponding to the memory chip are turned on.

The memory controller preferably applies the command signal representing the writing or reading mode and a data transfer start signal representing the start of data transfer to the control circuit. The control circuit is provided corresponding to the plurality of memory modules, and includes a plurality of first logic circuits and a plurality of second logic circuits. The plurality of first logic circuits are each built in at least one of the plurality of memory chips in a corresponding memory module, and generates a writing/reading end signal representing the end of writing/reading data to/from the plurality of memory chips in response to the command signal representing the writing or reading mode. The plurality of second logic circuits are provided corresponding to the plurality of memory modules, are each mounted on the printed circuit board in a corresponding memory module, each turn on the plurality of first switching elements in a corresponding memory module in response to the data transfer start signal, and each turn off the plurality of first switching elements in response to the writing/reading end signal.

In the memory module system described above, when the data transfer start signal is applied to a plurality of second logic circuits in a memory module selected by the memory controller, the plurality of first switching elements in the selected memory module are turned on, and when the writing/reading end signal is then applied to the plurality of second logic circuits, the plurality of first switching elements are turned off.

The plurality of first logic circuits each preferably include a write driver enable generation circuit, an output enable generation circuit, an OR circuit, and an edge detection circuit. The second logic circuits are each a flip-flop circuit that is set in response to the data transfer start signal and reset in response to a detection signal. The plurality of first switching elements in each of the memory module are each a transistor having a gate to receive the output signal of the second logic circuit serving as a flip-flop circuit. The write driver enable generation circuit generates a write driver enable signal which is activated after a writing latency period since the command signal representing the writing mode is received, and then inactivated after a burst length period since the activation. The output enable signal generation circuit generates an output enable signal which is activated after a column address strobe latency period since the command signal representing the reading mode is received, and then inactivated after a burst length period since the activation. The OR circuit receives the write driver enable signal and the output enable signal. The edge detection circuit detects an inactivation of an output signal from the OR circuit and generates a detection signal.

In the memory module system described above, when a memory module is selected by the memory controller, the data transfer start signal is applied to a flip-flop circuit in the selected module, and the flip-flop circuit is set. As a result, a transistor receiving the output signal of the flip-flop circuit at its gate is turned on, and the internal data bus in the selected memory module and the external data bus are connected. Subsequently, a detection signal representing the end of writing/reading data is applied to the flip-flop circuit from the edge detection circuit, and the flip-flop circuit is reset. As a result, the plurality of first switching elements are turned off, and the internal data bus in the selected memory module and the external data bus are disconnected.

The memory module system described above preferably further includes an external data strobe bus. The external data strobe bus is provided commonly to the plurality of memory modules. The plurality of memory modules each further include an internal data strobe bus and a second switching element. The internal data strobe bus is formed on the printed circuit board commonly to a plurality of memory chips. The second switching element is provided on the printed circuit board and connected between the internal data strobe bus and the external data strobe bus. The control circuit turns on the second switching element in a memory module selected by the memory controller, and turns off the second switching elements in the memory modules other than the selected memory module.

In the memory module system described above, when a memory module is selected by the memory controller, the control circuit turns on the plurality of first switching elements and the second switching element in the selected memory module, and turns off the plurality of first switching elements and the second switching elements in the memory modules other than the selected memory module. As a result, only the selected memory module is connected to the external data bus, and only the internal data strobe bus in the selected memory module is connected to the external data strobe bus. Thus, the internal data strobe buses in not selected memory modules do not have to be maintained in a high impedance state.

The plurality of memory modules each preferably further includes a precharge circuit. The precharge circuit precharges the internal data strobe bus to the ground potential or power supply potential when the second switching element is off. Thus, noises caused when the internal data strobe bus and the external data strobe bus are connected by switching the second switching element can be reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram showing the configuration of the memory module shown in FIG. 1;

FIG. 3 is a block diagram showing the configuration of the logic chip shown in FIG. 2;

FIG. 4 is a timing chart for use in illustration of the operation of the memory module system according to the first embodiment of the invention;

FIG. 7 is a timing chart for use in illustration of the operation of the memory module system according to the second embodiment of the invention;

FIG. 8 is a block diagram showing the internal configuration of a memory module according to a variation of the second embodiment of the invention;

FIG. 11 is a timing chart for use in illustration of the operation of the memory module system according to the third embodiment of the invention;

DESCRIPTION OF THE PREFERRED EMBODIMENTS

Figure 1:
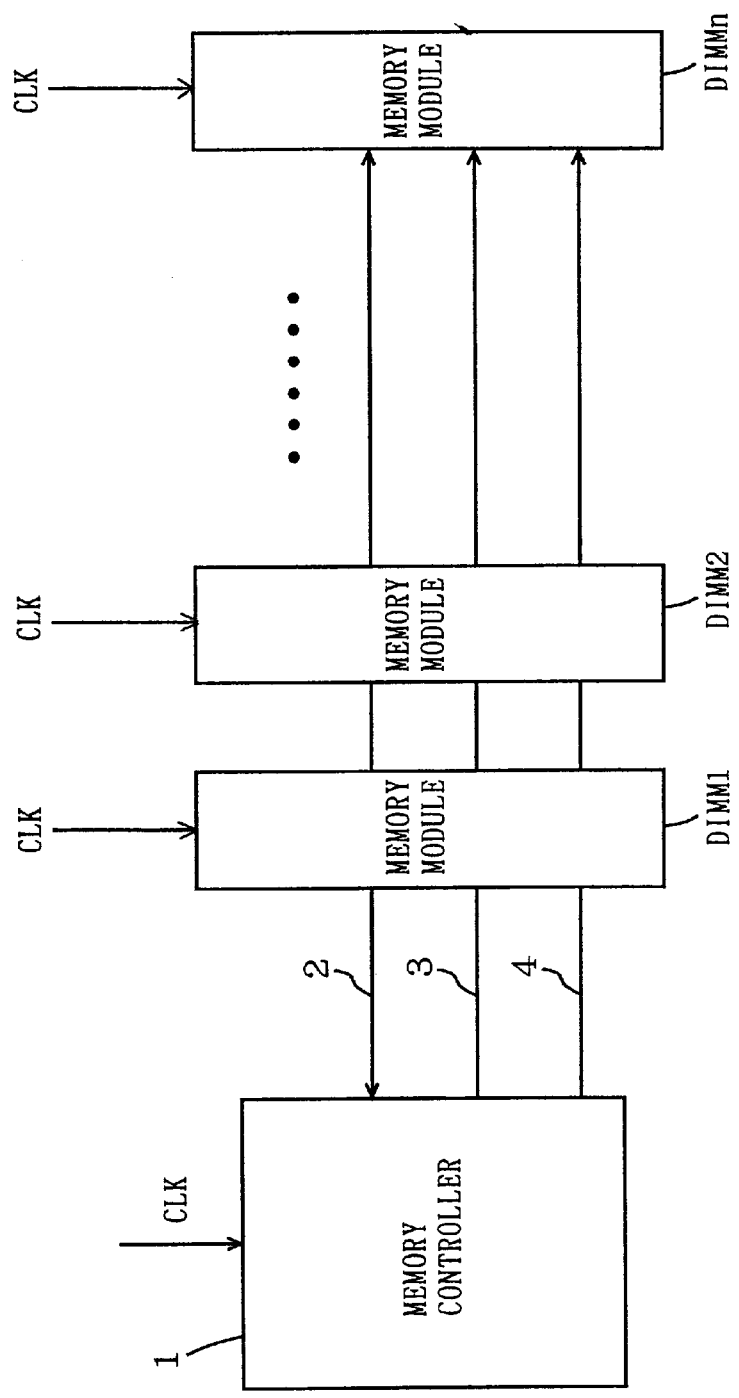
FIG. 1 is a block diagram showing the general configuration of a memory module system according to a first embodiment of the invention.

Embodiments of the present invention will be now described in detail in conjunction with the accompanying drawings, in which the same or corresponding portions are denoted by the same reference characters, and the description thereof is not repeated.

First Embodiment

FIG. 1 is a block diagram showing the generation configuration of a memory module system according to a first embodiment of the invention. Referring to FIG. 1, the memory module system includes a memory controller 1, an external data bus 2, a command signal line 3, an address signal line 4, n memory modules DIMM1 to DIMMn, and a clock generator 5. Memory controller 1 applies a command signal through command signal line 3 and an address signal through address signal line 4 to memory module DIMMi (i=1 to n), and exchanges data signals with memory module DIMMi (i=1 to n) through external data bus 2. External data bus 2, command signal line 3, and address signal line 4 are commonly provided to the n memory modules DIMM1 to DIMMn. Memory module DIMMi (i=1 to n) includes a plurality of memory chips (not shown), and writes/reads out a data signal to/from a memory chip in response to the command signal or address signal from memory controller 1. Clock generator 5 generates a clock signal CLK, and supplies the signal to memory controller 1 and memory module DIMMi (i=1 to n).

FIG. 2 is a block diagram showing the internal configuration of each of memory modules DIMMi (i=1 to n) shown in FIG. 1. Referring to FIG. 2, memory module DIMMi includes a printed circuit board 6, a plurality of input/output terminals 10, a plurality of memory chips 11, a plurality of internal data buses 12, a logic chip 13, and a plurality of switch transistors 14. Memory chip 11 is mounted on printed circuit board 6. Internal data buses 12 are each formed on printed circuit board 6, and connected between a corresponding memory chip 11 and a corresponding input/output terminal 10. Logic chip 13 is mounted on printed circuit board 6 to generate a switch control signal SWCTL. Switch transistors 14 are each provided on printed circuit boards 6, connected between a corresponding internal data bus 12 and a corresponding input/output terminal 10 to turn on/off in response to switch control signal SWCTL from logic chip 13.

FIG. 3 is a block diagram showing the configuration of logic chip 13 shown in FIG. 2. Referring to FIG. 3, logic chip 13 includes a read/write detection circuit 21, a mode register circuit 22, a counter circuit 23, a shifter circuit 24, and a flip-flop circuit 25.

Read/write detection circuit 21 receives a command signal (a chip selection signal /CS, a row address strobe signal /RAS, a column address strobe signal /CAS) input from memory controller 1, outputs a write command signal WRITE, when a data signal is written into a memory chip 11 in memory module DIMMi (i=1 to n), and outputs a read command signal READ, when a data signal is read out from a memory chip.

Mode register circuit 22 receives a command signal (write enable signal /WE) input from memory controller 1, an address signal Add, and clock signal CLK input from clock generator 5, defines a burst length BL for output to counter circuit 23 and defines a column address strobe (CAS) latency CL for output to shifter circuit 24.

Shifter circuit 24 receives write command signal WRITE from read/write detection circuit 21 and delays write command signal WRITE by a writing latency period WL for output, while receives read command signal READ from read/write detection circuit 21 and delays read command signal READ by a CAS latency period CL for output.

Counter circuit 23 receives an output signal from shifter circuit 24, burst length BL and clock signal CLK, and counts the number of clocks until a burst length period BL elapses after receiving the output signal from shifter circuit 24. When the counting ends, a pulse signal COUT is output to flip-flop circuit 25.

Flip-flop circuit 25 is set to an H level in response to the output signal from shifter circuit 24, and is reset to an L level in response to pulse signal COUT from counter circuit 23. The output signal from flip-flop circuit 25 is switch control signal SWCTL.

The operation of the memory module system as described above will be now described in conjunction with FIG. 4.

The operation will be described by way of illustrating a certain memory module DIMMk in the following cases: (a) memory module DIMMk is selected by memory controller 1 and a data signal DATA is written in memory chip 11 in memory module DIMMk, (b) memory module DIMMk is selected by memory controller 1, and data signal DATA is read out from memory chip 11 in memory module DIMMk, and (c) memory module DIMMk is not selected by memory controller 1.

(a) If memory module DIMMk is selected by memory controller 1 and data signal DATA is written in memory chip 11 in memory module DIMMk, read/write detection circuit 21 included in memory module DIMMk recognizes data signal DATA to be written into memory chip 11 in memory module DIMMk and outputs write command signal WRITE. After a writing latency period WL since the output of write command signal WRITE, flip-flop circuit 25 is set. Thus, switch control signal SWCTL is pulled from an L level to an H level, which turns on switch transistor 14 in memory module DIMMk. As a result, external data bus 2 and internal data bus 12 in memory module DIMMk are connected, so that data is written in memory chip 11.

After a burst length period BL elapses after the passage of writing latency period WL since the output of write command signal WRITE, pulse signal COUT is output from counter circuit 23 to flip-flop circuit 25, which is then reset. Thus, switch control signal SWCTL is pulled from an H level to an L level, which turns off switch transistor 14 in memory module DIMMk. As a result, external data bus 2 and internal data bus 12 in memory module DIMMk are disconnected, and at the same time writing of data signal DATA to memory chip 11 ends.

(b) If memory module DIMMk is selected by memory controller 1, and data signal DATA is read out from memory chip 11 in memory module DIMMk, read/write detection circuit 21 in memory module DIMMk recognizes data signal DATA to be read out from memory chip 11 in memory module DIMMk, and outputs read command signal READ. After a column address strobe latency period CL since the output of read command signal READ, flip-flop circuit 25 is set. Thus, switch control signal SWCTL is pulled from an L level to an H level, which turns on switch transistor 14 in memory module DIMMk. As a result, external data bus 2 and internal data bus 12 in memory module DIMMk are connected, so that data is read out from memory chip 11.

After a burst length period BL after the passage of a CAS latency period CL since the output of read command signal READ, pulse signal COUT is output from counter circuit 23 to flip-flop circuit 25, which resets flip-flop circuit 25. Thus, switch control signal SWCTL is pulled from an H level to an L level, which turns on switch transistor 14 in memory module DIMMk. As a result, external data bus 2 and internal data bus 12 in memory module DIMMk are disconnected, and at the same time reading of data signal DATA from memory chip 11 ends.

(c) If memory module DIMMk is not selected by memory controller 1, write command signal WRITE and read command signal READ are not output from read/write detection circuit 21, and switch control signal SWCTL is maintained at an L level. As a result, external data bus 2 and internal data bus 12 in memory module DIMMk continue to be disconnected.

Now, data writing or reading by selecting memory module DIMM1 among memory modules DIMMi (i=1 to n) by memory controller 1 will be now described.

When memory module DIMM1 is selected, external data bus 2 and internal data bus 12 in memory module DIMM1 are connected as described in (a) or (b). As in (c), internal data bus 12 in memory module DIMMi (i=2 to n) and external data bus 2 continue to be disconnected. As a result, while memory module DIMM1 is selected for data writing or reading, only internal data bus 12 in memory module DIMM1 is connected to external data bus 2. When data writing or reading to/from memory module DIMM1 ends, external data bus 2 and internal data bus 12 in memory module DIMM1 are disconnected.

As described above, according to the first embodiment, since logic chip 13 and a plurality of switch transistors 14 are provided for each of n memory modules DIMMi (i=1 to n), in data writing or reading to/from a memory module selected by memory controller 1, only internal data bus 12 in the selected memory module is connected to external data bus 2. As a result, increase in the number of memory modules connected to the external data bus does not increases the load of the external data bus. As a result, high-speed data transfer is maintained, and the capacity of the memory modules may be increased. Since logic chip 13 is mounted on printed circuit board 6, the specification of the existing memory chips does not have to be changed.

Second Embodiment

Figure 5:
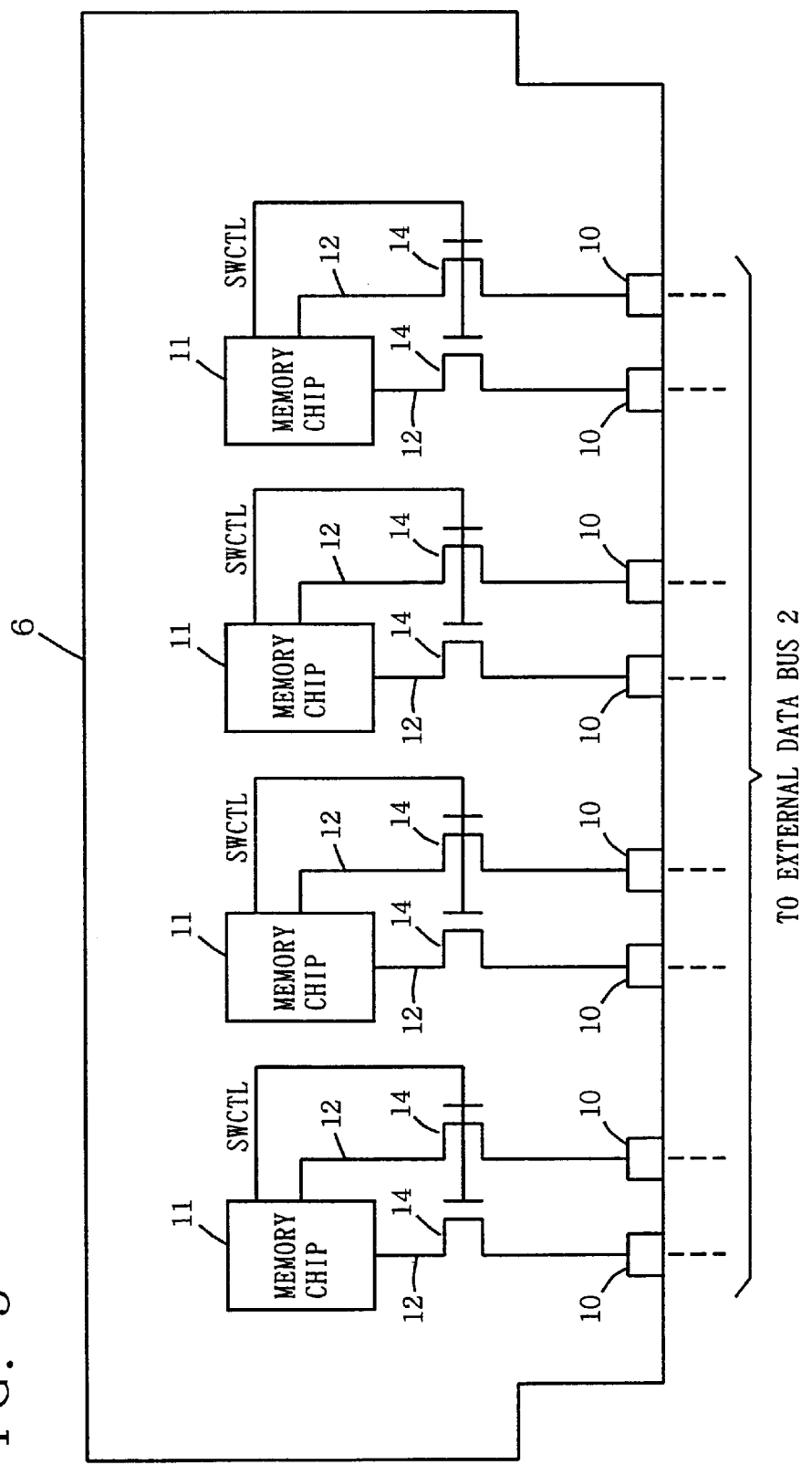
FIG. 5 is a block diagram showing the internal configuration of a memory module according to a second embodiment of the invention.

A memory module system according to a second embodiment of the invention includes a memory module DIMMi as shown in FIG. 5 in place of memory module DIMMi as shown in FIG. 2. Referring to FIG. 5, memory module DIMMi includes a printed circuit board 6, a plurality of input/output terminals 10, a plurality of memory chips 11, a plurality of internal data buses 12, and a plurality of switch transistors 14. Each memory chip 11 includes a logic circuit (not shown) mounted on printed circuit board 6 for generating a switch control signal SWCTL. Each internal data bus 12 is mounted on printed circuit board 6 and connected to a corresponding memory chip 11 and a corresponding input/output terminal. Switch transistor 14 is provided on printed circuit board 6 and connected between a corresponding internal data bus 12 and a corresponding input/output terminal 10, and turns on/off in response to switch control signal SWCTL from the logic circuit included in memory chip 11.

Figure 6:
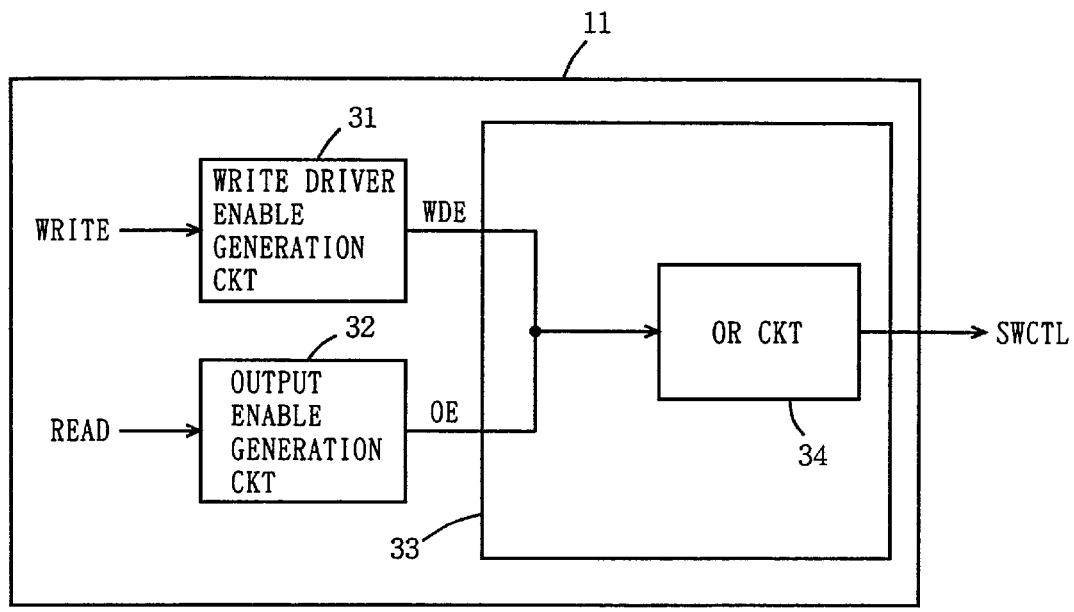
FIG. 6 is a block diagram showing the internal configuration of the memory chip shown in FIG. 5.

FIG. 6 is a block diagram showing the internal configuration of memory chip 11 shown in FIG. 5. Referring to FIG. 6, memory chip 11 includes a write driver enable generation circuit 31, an output enable generation circuit 32, and a logic circuit 33. Write driver enable generation circuit 31 receives a write command signal WRITE, and generates a write driver enable signal WDE which is activated after a writing latency period WL since write command signal WRITE is received, and is inactivated after a burst length period BL since the activation. Output enable generation circuit 32 receives a read command signal READ, and generates an output enable signal OE which is activated after a CAS latency period CL since read command signal READ is received, and is inactivated after a burst length period BL since the activation. Logic circuit 33 includes an OR circuit 34 which outputs the logical sum of write driver enable signal WDE and output enable signal OE. The output signal of OR circuit 34 is switch control signal SWCTL.

The operation of memory module DIMMi (i=1 to n) as described above will be detailed in conjunction with FIG. 7. The following three cases will be described: (a) memory module DIMMk is selected for data writing (b) memory module DIMMk is selected for data reading, and (c) memory module DIMMk is not selected.

(a) When memory module DIMMk is selected for data writing, write command signal WRITE is applied to write driver enable generation circuit 31. Write driver enable signal WDE rises after a writing latency period WL since a rising of write command signal WRITE, in response to which switch control signal SWCTL attains an H level. As a result, all the switch transistors 14 included in memory module DIMMk are turned on. External data bus 2 and all the internal data buses 12 in memory module DIMMk are then connected, and data is written in memory chip I1.

When write driver enable signal WDE falls after a burst length period BL following the passage of a writing latency period WL since the rising of write command signal WRITE, all the switch transistors 14 included in memory module DIMMk are turned off in response. As a result, external data bus 2 and all the internal data buses 12 in memory module DIMMk are disconnected, and the data writing to memory chip 11 ends.

(b) When memory module DIMMk is selected for data reading, read command signal READ is applied to output enable generation circuit 32. Output enable signal OE rises after a CAS latency period CL since the rising of read command signal READ, in response to which switch control signal SWCTL attains an H level. As a result, all the switch transistors 14 included in memory module DIMMk are turned on. External data bus 2 and all the internal data buses 12 in memory module DIMMk are therefore connected, and data is read out from memory chip 11.

Output enable signal OE falls after a burst length period BL after the passage of a CAS latency period CL since the rising of read command signal READ. As a result, all the switch transistors 14 included in memory module DIMMk are turned off. External data bus 2 and all the internal data buses 12 in memory module DIMMk are therefore disconnected, and data reading from memory chip 11 ends.

(c) When memory module DIMMk is not selected, neither write command signal WRITE nor read command signal READ is applied, and switch control signal SWCTL is maintained at an L level. As a result, external data bus 2 and all the internal data buses 12 in memory module DIMMk continue to be disconnected.

As described above, according to the second embodiment, since a plurality of switch transistors 14 are provided for each of n memory modules DIMMi (i=1 to n), and a logic circuit 34 is provided in each of a plurality of memory chips 11 included in each memory module DIMMi, during data writing or reading to/from a memory module selected by memory controller 1, only internal data bus 12 in the selected memory module is connected to external data bus 2. As a result, increase in the number of memory modules connected to the external data bus does not increase the load of the external data bus, high-speed data transfer is maintained, and the capacity of the memory modules may be increased. Logic circuit 34 is provided inside memory chip 11, and therefore a new logic chip does not have to be provided on the printed circuit board.

Note that although switch control signal SWCTL is output to a plurality of corresponding switching transistors 14 from each of the plurality of memory chips 11, switch control signal SWCTL may be output from at least one of the plurality of memory chips 11 to all the switch transistors 14 included in memory module DIMMi. In that case, the switch control signal SWCTL output terminals of memory chips 11 which do not output switch control signal SWCTL to switch transistors 14 may be terminated to any of floating, power supply voltage and ground voltage level.

Third Embodiment

Figure 9:
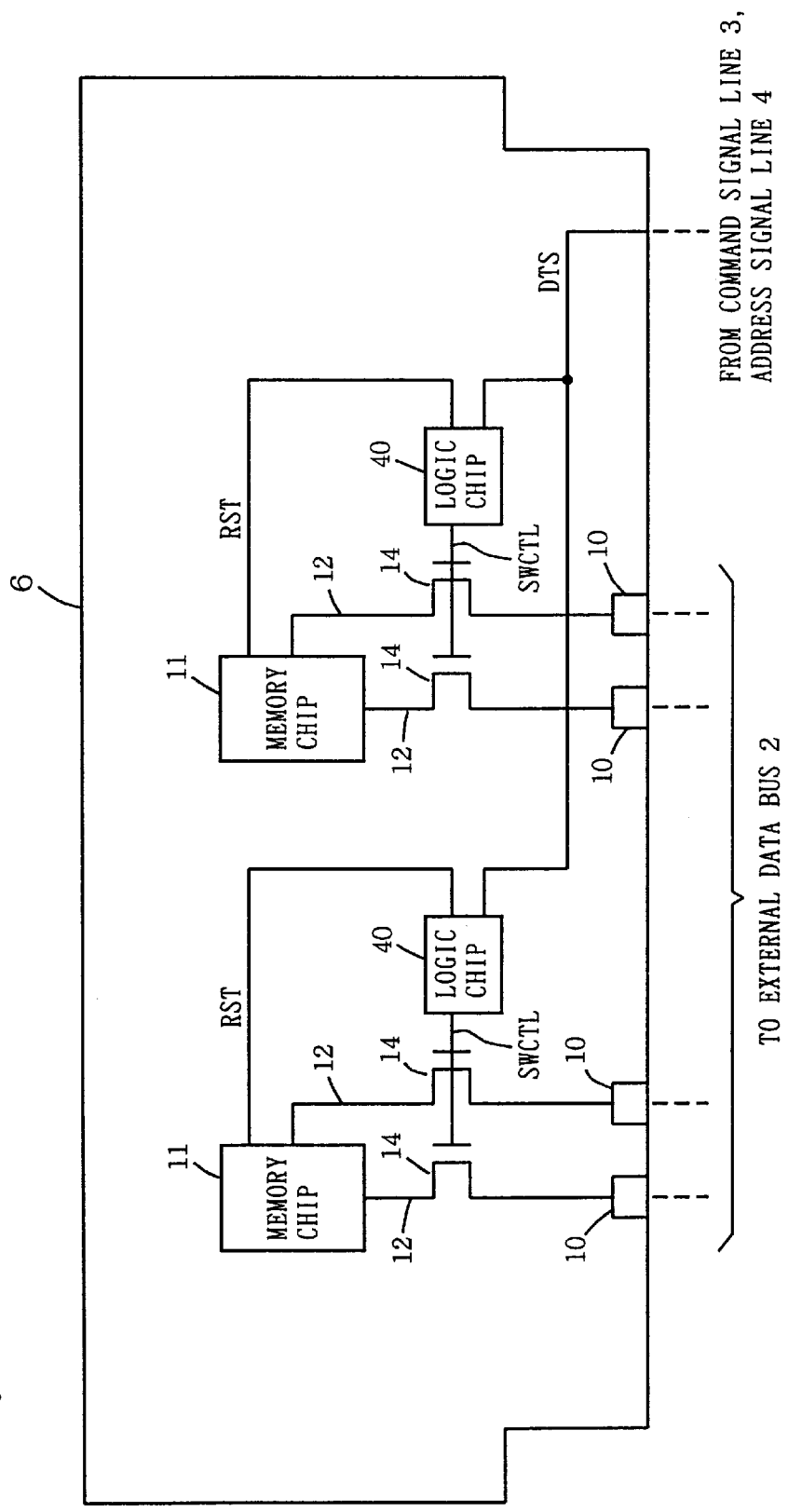
FIG. 9 is a block diagram showing the internal configuration of a memory module according to a third embodiment of the invention.

A memory module system according to a third embodiment of the invention includes a memory module DIMMi (i=1 to n) shown in FIG. 9 in place of memory module DIMMi (i=1 to n) shown in FIG. 2. Referring to FIG. 9, memory module DIMMi includes a printed circuit board 6, a plurality of input/output terminals 10, a plurality of memory chips 11, a plurality of internal data buses 12, a plurality of logic chips 40, and a plurality of switch transistors 14. Memory chip 11 is mounted on printed circuit board 6 and includes a logic circuit 41 which will be described. Each internal data bus 12 is formed on printed circuit board 6 and connected with a corresponding memory chip 11 and a corresponding input/output terminal 10. Logic chip 40 is provided corresponding to memory chip 11 and on printed circuit board 6, receives a data transfer start signal DTS from memory controller 1 and an output signal from logic circuit 41 and generates a switch control signal SWCTL. Switch transistor 14 is provided on printed circuit board 6, connected between a corresponding internal data bus 12 and a corresponding input/output terminal 10, and turns on/off in response to switch control signal SWCTL from logic chip 40.

Figure 10:
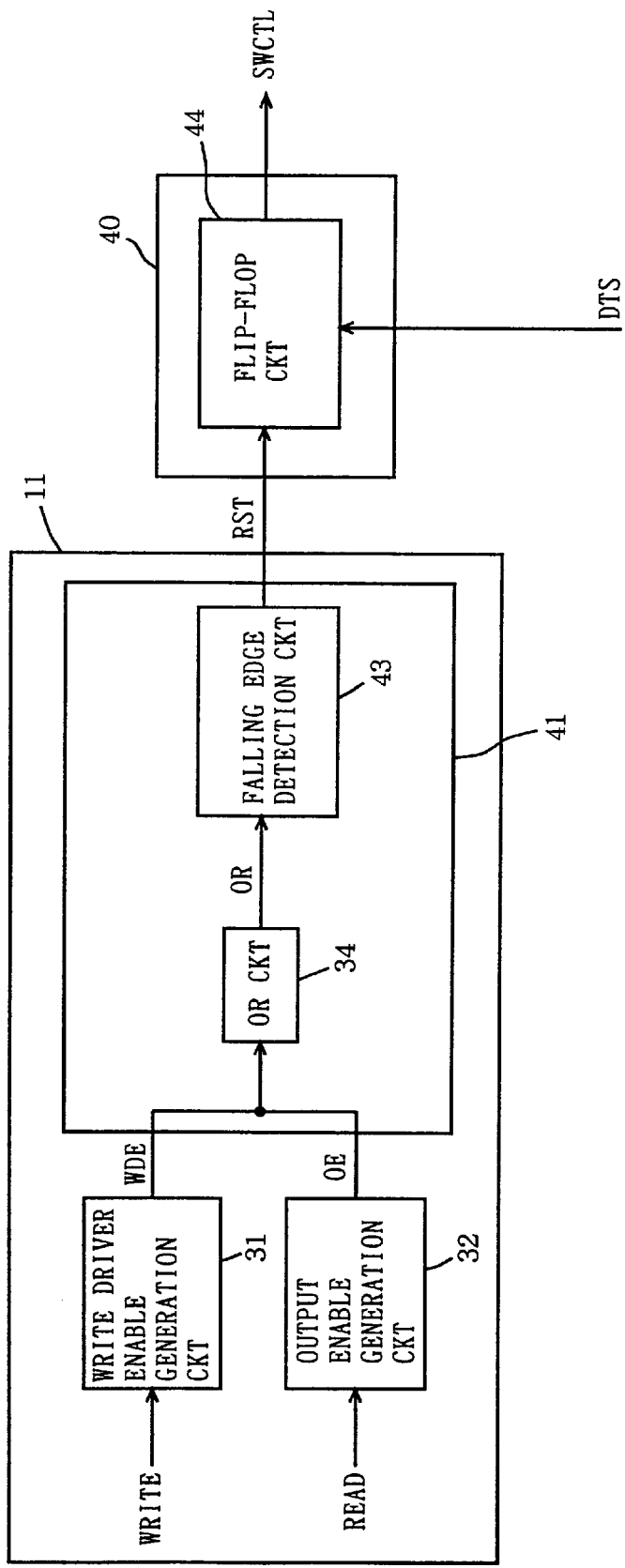
FIG. 10 is a block diagram showing the internal configuration of the memory chip and logic chip shown in FIG. 9.

FIG. 10 is a block diagram showing the internal configuration of memory chip 11 and logic chip 40 shown in FIG. 9. Referring to FIG. 10, memory chip 11 includes a write driver enable generation circuit 31 and an output enable generation circuit 32 identical to those shown in FIG. 6, and logic circuit 41. Logic circuit 41 includes an OR circuit 34 identical to that in FIG. 6, and a falling edge detection circuit 43. Falling edge detection circuit 43 outputs a reset signal RST in response to a falling of an output signal OR from OR circuit 34. Logic chip 40 includes a flip-flop circuit 44 set in response to a data transfer start signal DTS from memory controller 1 and reset in response to reset signal RST from falling edge detection circuit 43. The output of flip-clop circuit 44 is switch control signal SWCTL.

The operation of this memory module system will be now described in conjunction with FIG. 11. The following three cases will be described; (a) memory module DIMMk is selected for data writing, (b) memory module DIMMk is selected for data reading, and (c) memory module DIMMk is not selected.

(a) When memory module DIMMk is selected for data writing, data transfer start signal DTS is applied to all the logic chips 40 in memory module DIMMk, and flip-flop circuit 44 in logic chip 40 is set. As a result, switch control signal SWCTL generated from all the logic chips 40 in memory module DIMMk rises, in response to which all the switch transistors 14 included in memory module DIMMk are turned on. Thus, external data bus 2 and all the internal data buses 12 in memory module DIMMk are connected, and data is written to memory chip 11.

Write command signal WRITE is applied to write driver enable generation circuit 31 in each of all the memory chips 11 included in memory module DIMMk. In response to write command signal WRITE, as is the case with the second embodiment, write driver enable signal WDE falls after a burst length period BL following the passage of a writing latency period WL since a rising of write command signal WRITE. In response to this, reset signal RST output from falling edge detection circuit 43 rises. In response to the rising of reset signal RST, flip-flop 44 in logic chip 40 is reset. As a result, switch control signal SWCTL generated from all the logic chips 40 included in memory module DIMMk fall, in response to which all the switch transistors 14 included in memory module DIMMk are turned off. Thus, external data bus 2 and all the internal data buses 12 in memory module DIMMk are disconnected, and data writing to memory chip 11 ends.

(b) When memory module DIMMk is selected for data reading, data transfer start signal DTS is applied to all the logic chips 40 in memory module DIMMk, and flip-flop circuit 44 in logic chip 40 is set. As a result, as is the case with (a), external data bus 2 and all the internal data buses 12 in memory module DIMMk are connected, and data is read out from memory chip 11.

Read command signal READ is applied to output enable generation circuit 32 in each of all the memory chip 11 included in memory module DIMMk. In response to read command signal READ, as is the case with the second embodiment, output enable signal OE falls after a burst length period BL after the passage of a CAS latency period CL since the rising of read command signal READ. In response to this, reset signal RST output from falling edge detection circuit 43 rises. In response to the rising of reset signal RST, flip-flop circuit 44 in logic chip 40 is reset. As a result, as is the case with (a), external data bus 2 and all the internal data buses 12 in memory module DIMMk are disconnected, and data reading from memory chip 11 ends.

(c) When memory module DIMMk is not selected, data transfer start signal DTS is not applied to any of logic chips 40 in memory module DIMMk, and neither write command signal WRITE nor read command signal READ is applied to write driver enable generation circuit 31 or output enable generation circuit 32 in each of all the memory chips 11 included in memory module DIMMk. As a result, switch control signal SWCTL is maintained at an L level. Therefore, external data bus 2 and all the internal data buses 12 in memory module DIMMk continue to be disconnected.

As in the foregoing, according to the third embodiment, since there are provided a logic chip 40 and a plurality of switch transistors 14 for each of n memory modules DIMMi (i=1 to n), and logic circuit 41 is provided inside each of the plurality of memory chips 11 included in each memory module DIMMi, in data writing or reading to/from a memory module selected by memory controller 1, only internal data bus 12 in the selected memory module is connected to external data bus 2. Therefore, increase in the number of memory modules to be connected to the external data bus does not increase the load of the external data bus, high-speed data transfer is maintained, and the capacity of the memory modules can be increased.

Fourth Embodiment

Figure 12:
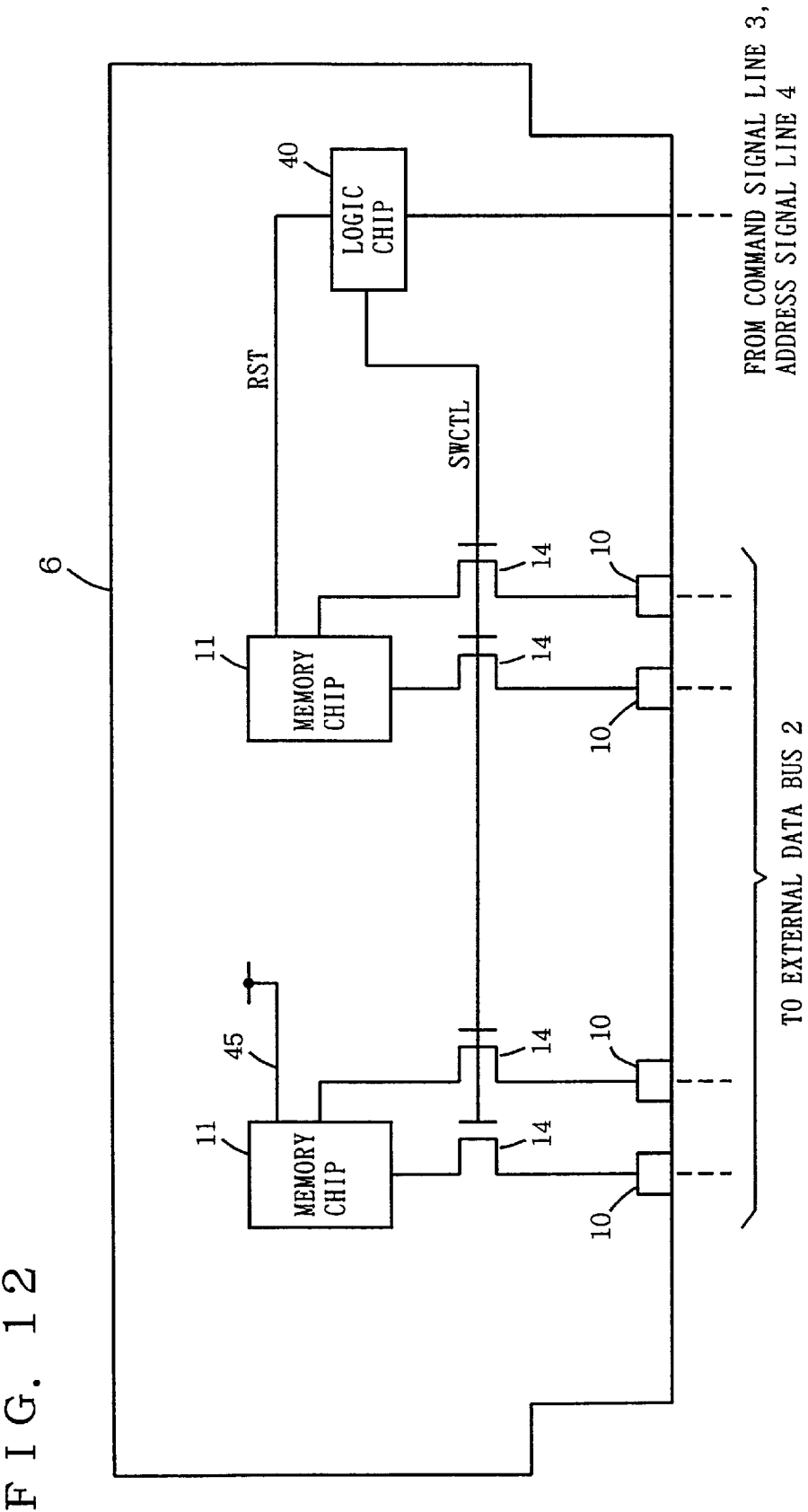
FIG. 12 is a block diagram showing the internal configuration of a memory module according to a fourth embodiment of the invention.

In the above third embodiment, a logic chip 40 is provided for each of the plurality of memory chips 11 included in memory module DIMMi, logic chip 40 is provided for only one of the plurality of memory chips 11 included in memory module DIMMi according to a fourth embodiment of the invention as shown in FIG. 12, so that switch control signal SWCTL from logic chip 40 is applied to all the switch transistors 14 included in memory module DIMMi.

In this manner, the same effects as the third embodiment may be brought about. Note that an output terminal 45 from a logic circuit 34 in memory chip 11 not connected to logic chip 40 may be connected to any of floating, power supply voltage and ground voltage.

Only the Memory chip 11 corresponding to logic chip 40 should include logic circuit 34, in other words, all the memory chips 11 included in the memory module do not have to include logic circuit 34.

Fifth Embodiment

Figure 13:
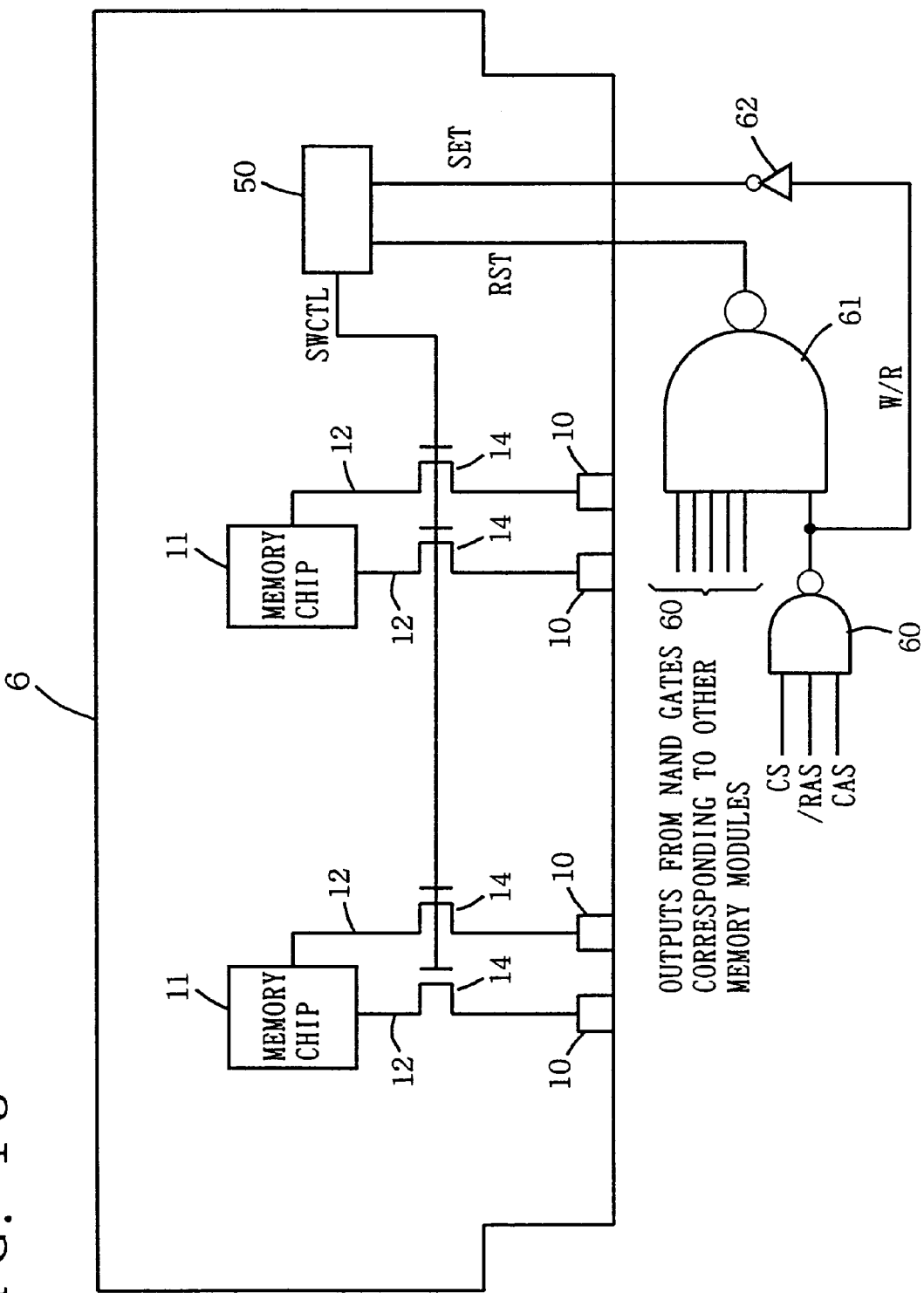
FIG. 13 is a block diagram showing the configuration of a memory module according to a fifth embodiment of the invention.

A memory module system according to a fifth embodiment of the invention includes a memory module DIMMi shown in FIG. 13 in place of memory module DIMMi shown in FIG. 2, an NAND gate 60 shown in FIG. 13 corresponding to each of memory modules DIMMi, and a common NAND gate 61 to all the memory modules DIMMi.

Referring to FIG. 13, NAND gate 60 outputs a select signal /CS applied to each of memory modules DIMMi from memory controller 1, and the inverted OR of row address strobe signal RAS and column address strobe signal /CAS. NAND gate 61 outputs, as a reset signal RST, all the inverted ORs of output signals W/R from NAND gate 60 corresponding to memory modules DIMMi. An inverter 62 inverts output signal W/R from NAND gate 60 and outputs the inverted signal as a set signal SET.

Memory module DIMMi includes a printed circuit board 6, a plurality of input/output terminals 10, a plurality of memory chips 11, a plurality of internal data buses 12, a logic chip 50 and a plurality of switch transistors 14. Memory chip 11 is mounted on printed circuit boards 6. Internal data bus 12 is mounted on printed circuit board 6 and connected between a corresponding memory chip 11 and a corresponding input/output terminal 10. Logic chip 50 is mounted on printed circuit board 6, receives set signal SET and reset signal RST and generates switch control signal SWCTL. Switch transistor 14 is provided on printed circuit board 6, and connected between a corresponding internal data bus 12 and a corresponding input/output terminal 10, and turns on and off in response to switch control signal SWCTL from logic chip 50.

Figure 14:
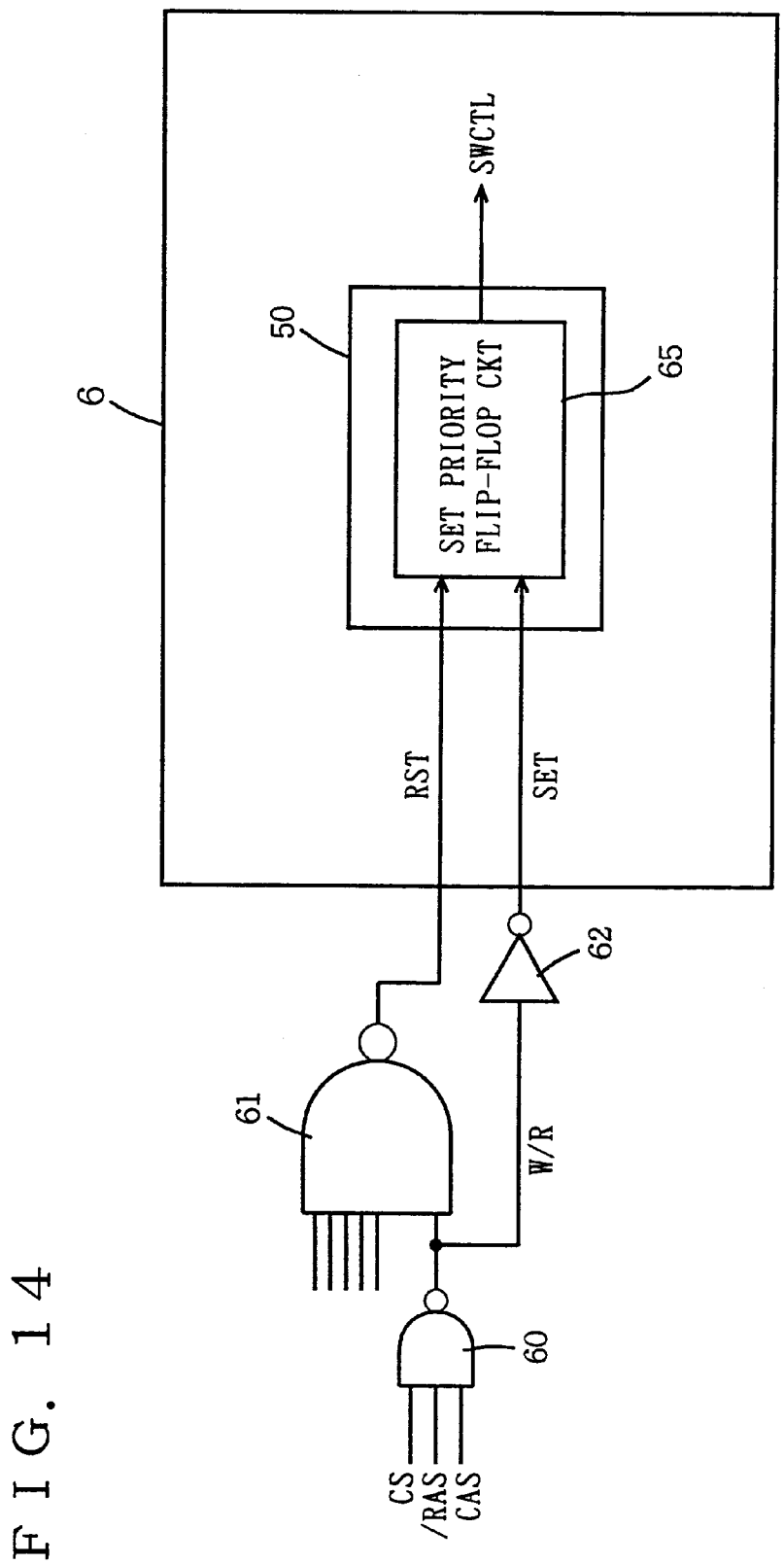
FIG. 14 is a block diagram showing the configuration of the logic chip according to the fifth embodiment of the invention.

FIG. 14 is a block diagram showing the internal configuration of logic chip 50 shown in FIG. 13. Referring to FIG. 14, logic chip 50 includes a set priority flip-flop circuit 65 set in response to set signal SET and reset in response to reset signal RST, and set if set signal SET and reset signal RST are input at a time. The output signal of set priority flip-flop circuit 65 is switch control signal SWCTL.

Figure 15:
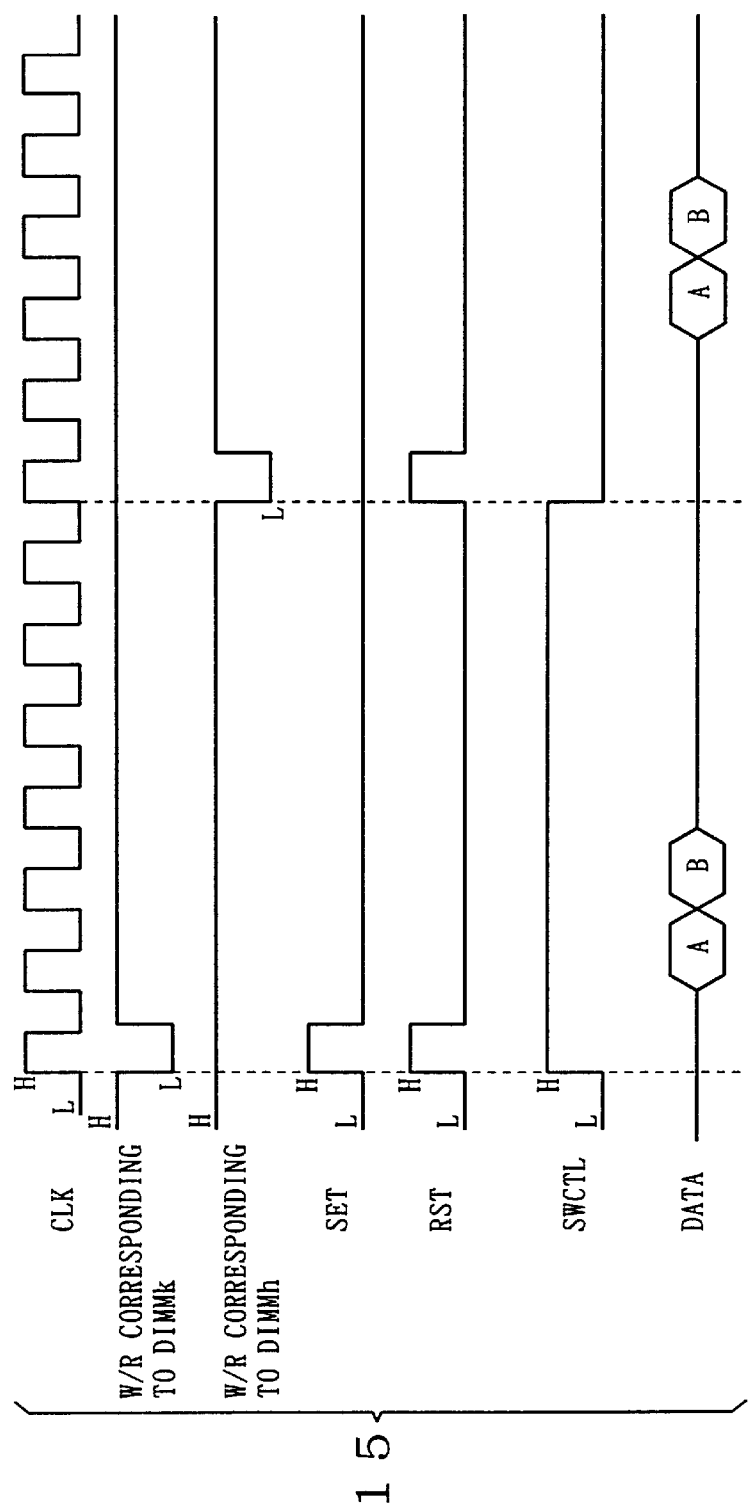
FIG. 15 is a timing chart for use in illustration of the operation of the memory module system according to the fifth embodiment of the invention.

The operation of this memory module system described above will be now described in conjunction with FIG. 15.

When memory module DIMMk is selected by memory controller 1, an output signal W/R from NAND gate 60 corresponding to memory module DIMMk falls. An output signal W/R from each of NAND gates 60 corresponding to memory modules DIMMi other than the selected memory module DIMMk is maintained at an H level. As a result, in response to the falling of output signal W/R from NAND gate 60 corresponding to the selected memory module DIMMk, set signal SET and reset signal RST rise at a time, which sets set priority flip-flop circuit 65 included in memory module DIMMk, and switch control signal SWCTL rises. In response to this, all the switch transistors 14 included in memory module DIMMk are turned on, external data bus 12 and all the internal data buses in memory module DIMMk are connected.

Meanwhile, set signal SET to set priority flip-flop circuits 65 included in memory modules DIMMi other than the selected memory module DIMMk is still at an L level, all the switch transistors 14 included in all the memory modules DIMMi other than the selected memory module DIMMk are turned off. As a result, external data bus 12 and all the internal data buses included in all the memory modules DIMMi other than the selected memory module DIMMk are disconnected.

Subsequently, when a memory module DIMMh different from memory module DIMMk is selected by memory controller 1, output signal W/R from NAND gate 60 corresponding to memory module DIMMh falls. Output signal W/R from each of NAND gates 60 corresponding to memory modules DIMMi other than the selected memory module DIMMh is still at an H level. In response to this, set priority flip-flop circuit 65 corresponding to memory module DIMMk is reset, and switch control signal SWCTL falls. In response to this, all the switch transistors 14 included in memory module DIMMk are turned off, and external data bus 12 and all the internal data buses in memory module DIMMk are disconnected.

As described above, according to the fifth embodiment, since NAND gate 60 is provided corresponding to each of memory modules DIMMi, NAND gate 61 is provided common to memory modules DIMMi, logic chip 50 is provided on the printed circuit board in each of memory modules DIMMi, and a plurality of switch transistors 14 are provided, all the switch transistors 14 included in memory module DIMMk selected by memory controller 1 are turned on, and then all the switch transistors 14 included in memory module DIMMk are turned off if another memory module DIMMh is selected. All the switch transistors included in all the memory modules other than the selected memory module are turned off. Therefore, if data is written or read out to/from the selected memory module DIMMk, only the internal data bus 12 included in the selected memory module DIMMk is connected to external data bus. As a result, increase in the number of memory modules DIMMi connected to external data bus 2 does not increase the load of external data bus 2, high-speed data transfer is maintained and the capacity of memory modules DIMMi may be increased.

Sixth Embodiment

Figure 16:
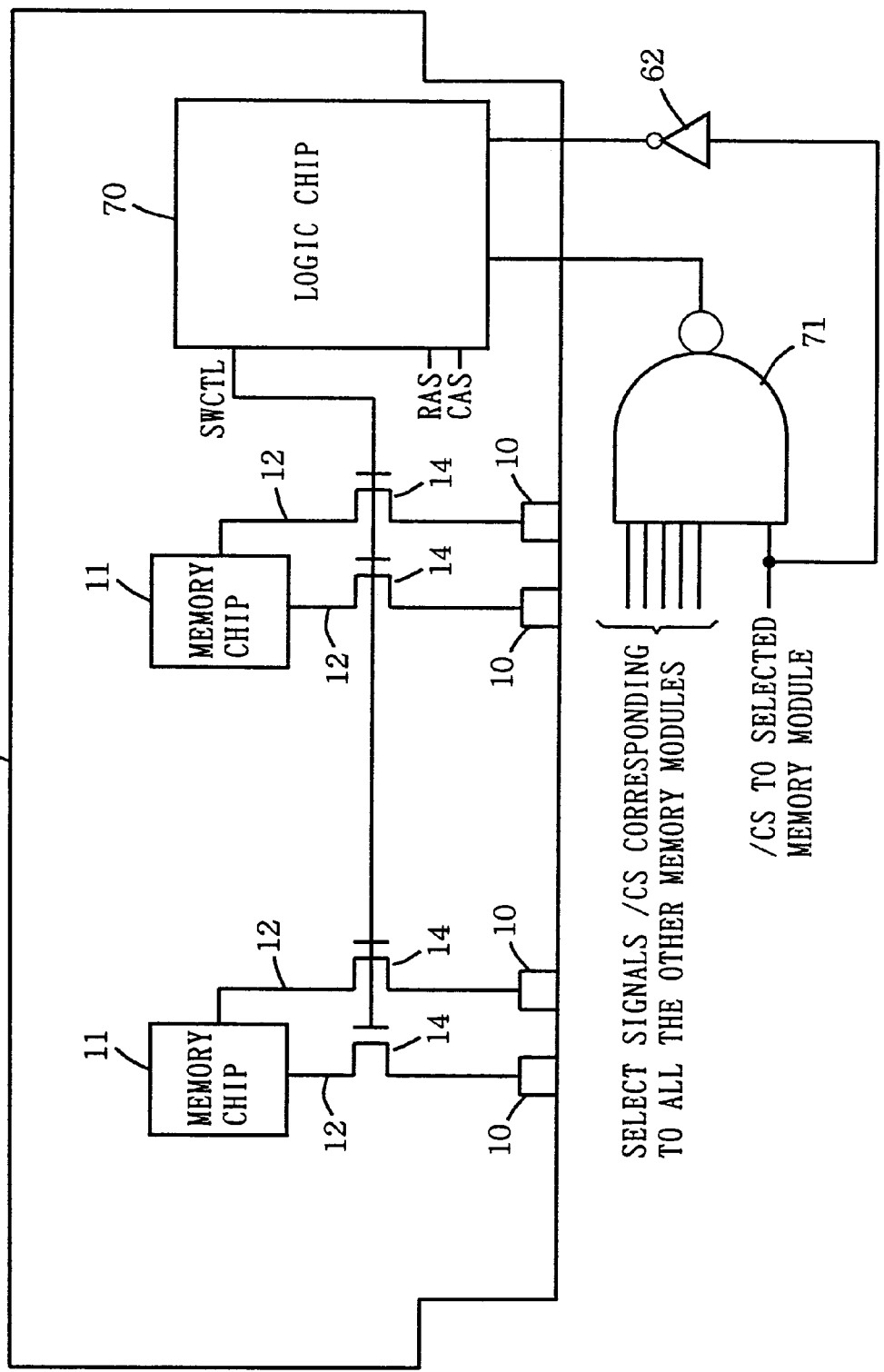
FIG. 16 is a block diagram showing the configuration of a memory module according to a sixth embodiment of the invention.

A memory module system according to a sixth embodiment of the invention is removed of NAND gate 60 in the memory module shown in FIG. 13, includes an NAND gate 71 shown in FIG. 16 in place of NAND gate 61, and a logic chip 70 shown in FIG. 16 in place of logic chip 50.

Referring to FIG. 16, NAND gate 71 outputs the inverted OR of select signals CS independently applied to each of memory modules DIMMi from memory controller 1. Logic chip 70 is mounted on printed circuit board 6, receives output signals from inverter 62 and NAND gate 71, a row address strobe signal RAS, and a column address strobe signal CAS, and generates switch control signal SWCTL.

Figure 17:
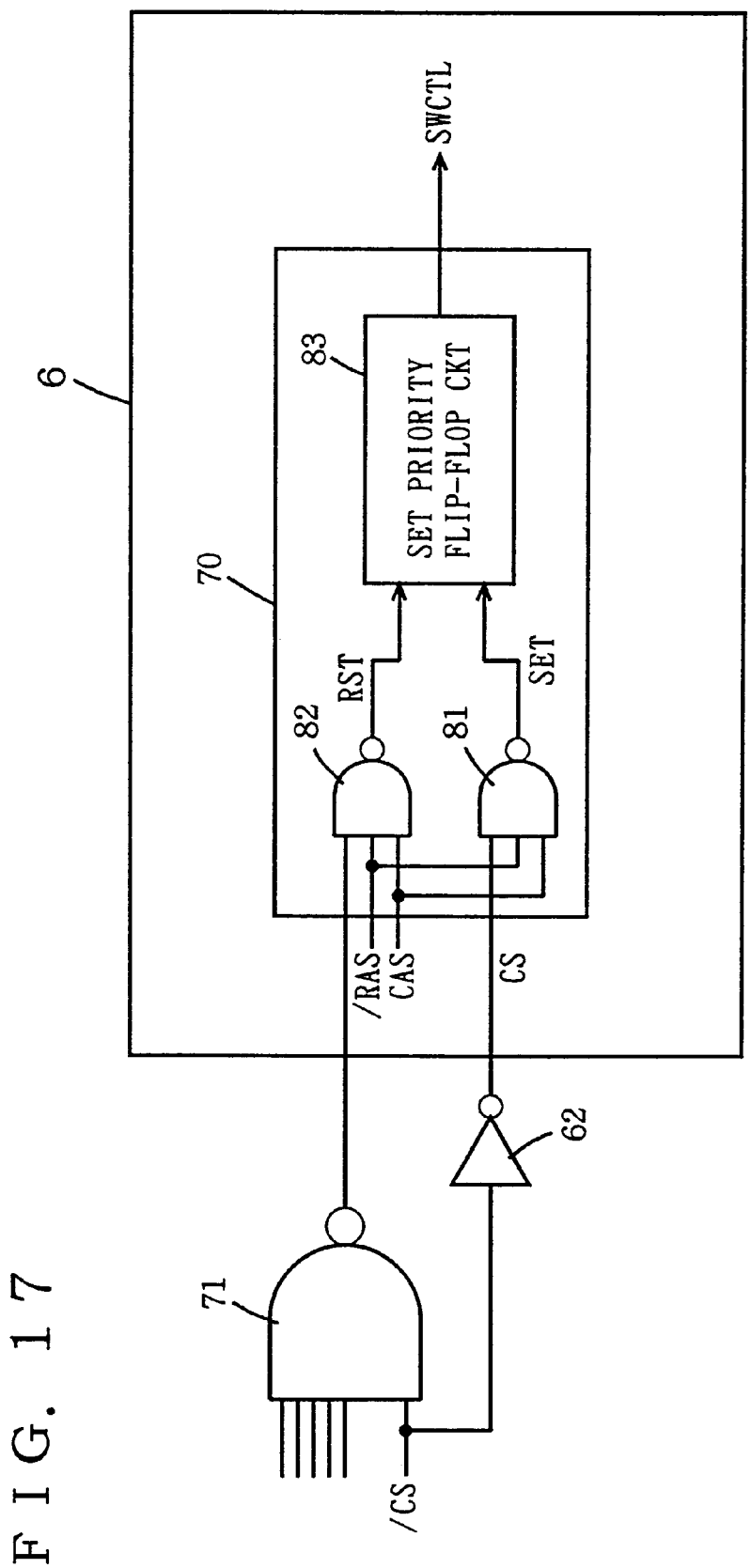
FIG. 17 is a block diagram showing the configuration of a logic chip according to the sixth embodiment of the invention.

FIG. 17 is a block diagram showing the configuration of logic chip 70 shown in FIG. 16. Referring to FIG. 17, logic chip 70 includes NAND gates 81 and 82, and a set priority flip-flop circuit 83. NAND gate 81 generates a set signal SET in response to the inverted signal CS of select signal /CS applied to memory module DIMMi, row address strobe signal /RAS and column address strobe signal CAS. NAND gate 82 generates a reset signal RST in response to an output signal from NAND gate 71, row address strobe signal /RAS and column address strobe signal CAS. Set priority flip-flop circuit 83 is set in response to set signal SET, reset in response to reset signal RST and is set if set signal SET and reset signal RST are input at a time. The output signal of set priority flip-flop circuit 65 is switch control signal SWCTL.

Figure 18:
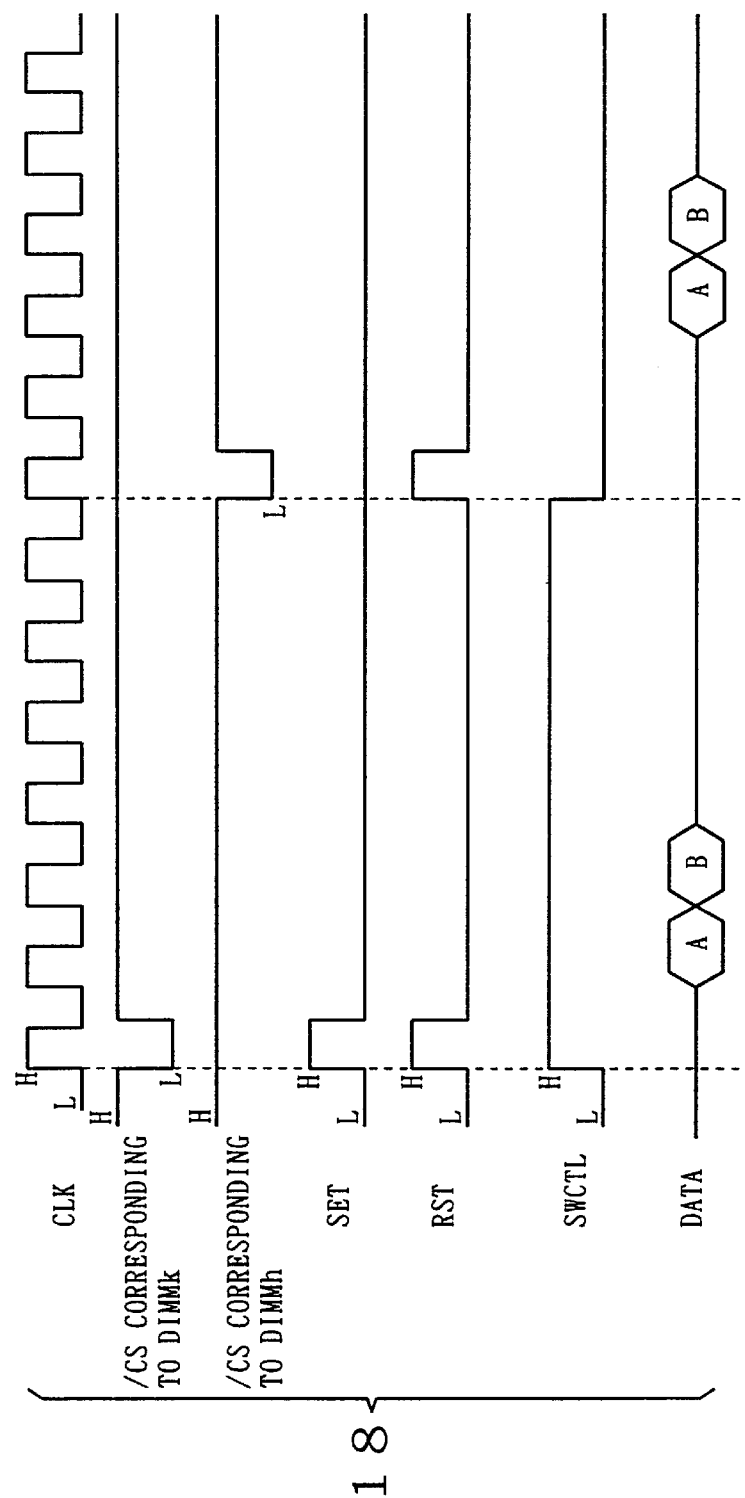
FIG. 18 is a timing chart for use in illustration of the operation of a memory module system according to the sixth embodiment of the invention.

The operation of this memory module system will be now described in conjunction with FIG. 18.

When memory module DIMMk is selected by memory controller 1, select signal /CS corresponding to memory module DIMMk falls. In response to this, set signal SET output from NAND gate 81 and reset signal RST output from NAND gate 82 rise, set priority flip-flop circuit 65 included in memory module DIMMk is set, and switch control signal SWCTL rises. In response to this, all the switch transistors 14 included in memory module DIMMk are turned on, and external data bus 12 and all the internal data buses in memory module DIMMk are connected.

Meanwhile, since select signal /CS corresponding to each of memory modules DIMMi other than the selected memory module DIMMk is still at an H level, set signal SET to set priority flip-flop circuit 65 included in each of memory modules DIMMi is still at an L level. As a result, all the switch transistors 14 included in memory modules DIMMi other than the selected memory module DIMMk are turned off. Therefore, external data bus 12 and all the internal data buses included in all the memory modules DIMMi other than the selected memory module DIMMk are disconnected.

Subsequently, when another memory module DIMMh different from memory module DIMMk is selected by memory controller 1, select signal/CS corresponding to memory module DIMMh falls. Select signal /CS corresponding to each of memory modules DIMMi other than the selected memory module DIMMh is still an H level. As a result, set priority flip-flop circuit 65 corresponding to memory module DIMMk is reset, and switch control signal SWCTL falls. In response to this, all the switch transistors 14 included in memory module DIMMk are turned off, and external data bus 12 and all the internal data buses in memory module DIMMk are disconnected.

As in the foregoing, according to the sixth embodiment, NAND gate 60 is removed from the memory module according to the fifth embodiment, NAND gate 71 shown in FIG. 16 is provided in place of NAND gate 6 1, and logic chip 70 shown in FIG. 16 is provided in place of logic chip 50, such that the same effects as the fifth embodiment may be brought about.

Seventh Embodiment

A memory module system according to a seventh embodiment of the invention employs a data strobe signal as a timing signal for writing/reading a data signal to/from a memory chip. A data signal is read or write from/to a memory chip included in a selected memory module in response to the data strobe signal.

Figure 19:
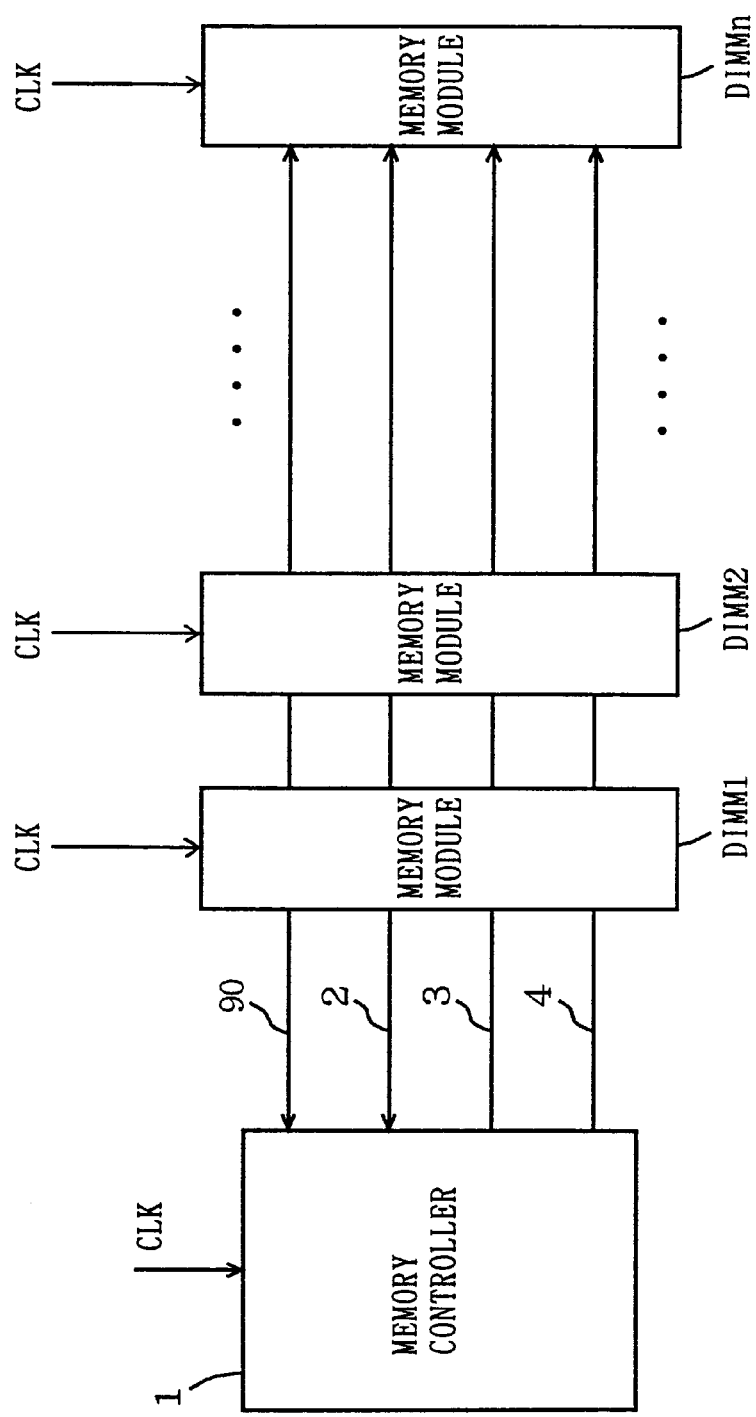
FIG. 19 is a block diagram showing the general configuration of a memory module system according to a seventh embodiment of the invention.

FIG. 19 is a block diagram showing the general configuration of the memory module system according to the seventh embodiment. Referring to FIG. 19, the memory module system includes an external data strobe bus 90 provided common to n memory modules DIMM1 to DIMMn in addition to the configuration shown in FIG. 1.

Figure 20:
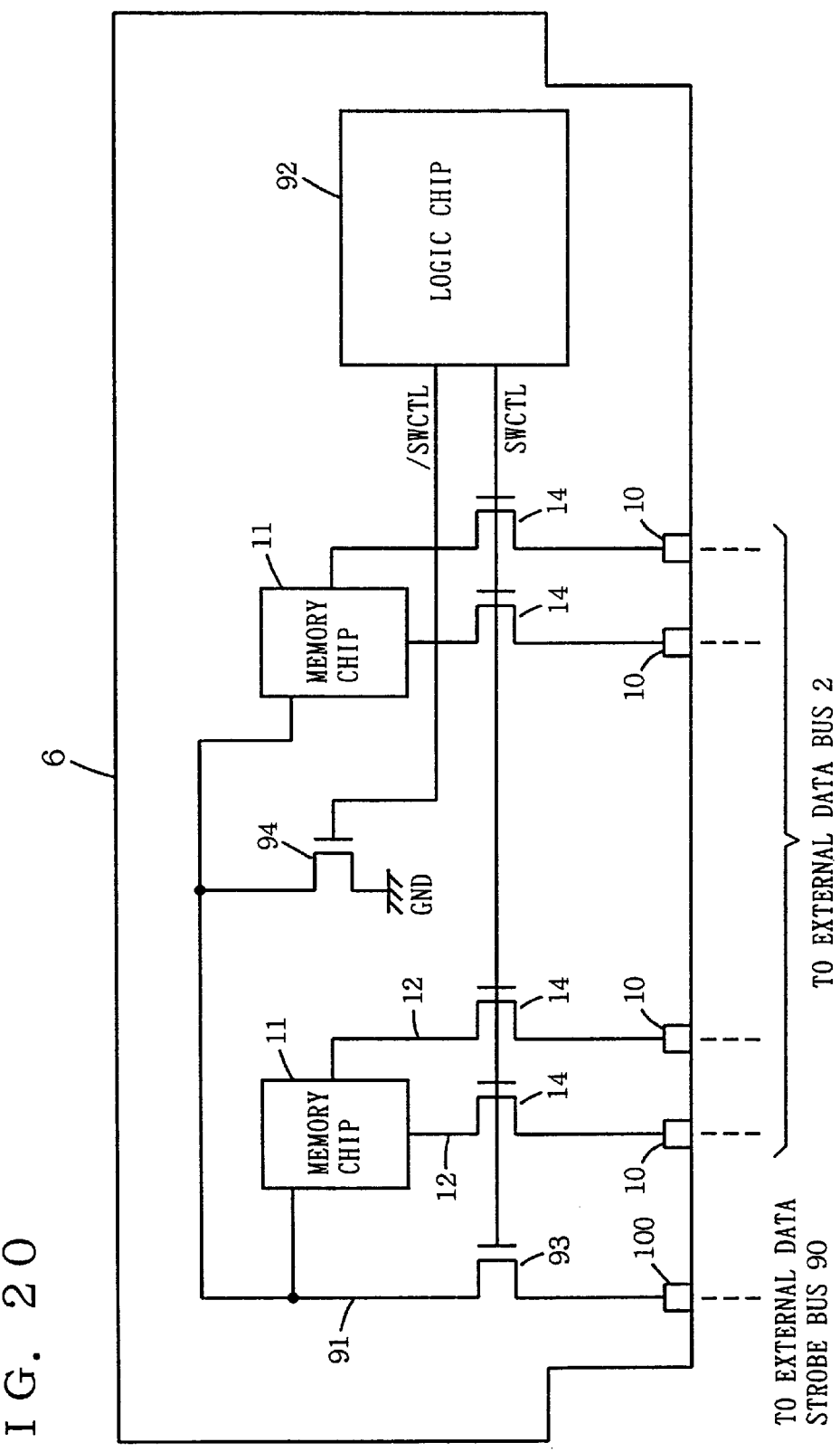
FIG. 20 is a block diagram showing the configuration of the memory module according to the seventh embodiment of the invention.

FIG. 20 is a block diagram showing the internal configuration of each of memory modules DIMMi (i=1 to n) shown in FIG. 19. Referring to FIG. 20, memory module DIMMi includes a printed circuit board 6, a plurality of input/output terminals 10, a plurality of memory chips 11, a plurality of internal data buses 12, a plurality of switch transistors 14, an internal data strobe bus 91, a logic chip 92, transistors 93 and 94, and an input/output terminal 100. Internal data strobe bus 91 is mounted on printed circuit board 6, connected commonly to the plurality of memory chips 11 and further connected to input/output terminal 100. Logic chip 92 is mounted on printed circuit board 6, and outputs switch control signal SWCTL and the inverse thereof /SWCTL. Transistor 93 is provided on printed circuit board 6, connected between data strobe bus 91 and input/output terminal 100, and turns on/off in response to switch control signal SWCTL. Transistor 94 is connected between internal data strobe bus 91 and a ground node GND to turn on/off in response to signal /SWCTL, the inverse of switch control signal SWCTL. Input/output terminal 100 is connected to external data strobe bus 90.

Figure 21:
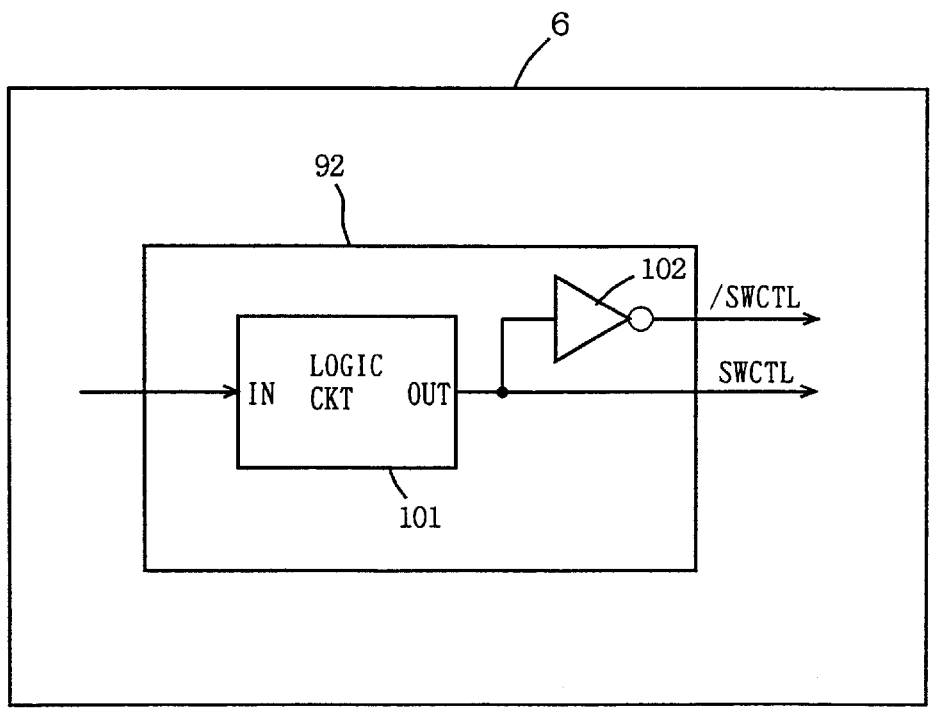
FIG. 21 is a block diagram showing the configuration of a logic chip according to the seventh embodiment of the invention.

FIG. 21 is a block diagram showing the configuration of logic chip 92 shown in FIG. 20. Referring to FIG. 21, logic chip 92 includes a logic circuit 101 and an inverter 102. Logic circuit 101 has the internal configuration the same as logic chip 13 shown in FIG. 3 and operates in the same manner. Inverter 102 outputs the inverse /SWCTL of output signal SWCTL from logic circuit 101.

Figure 22:
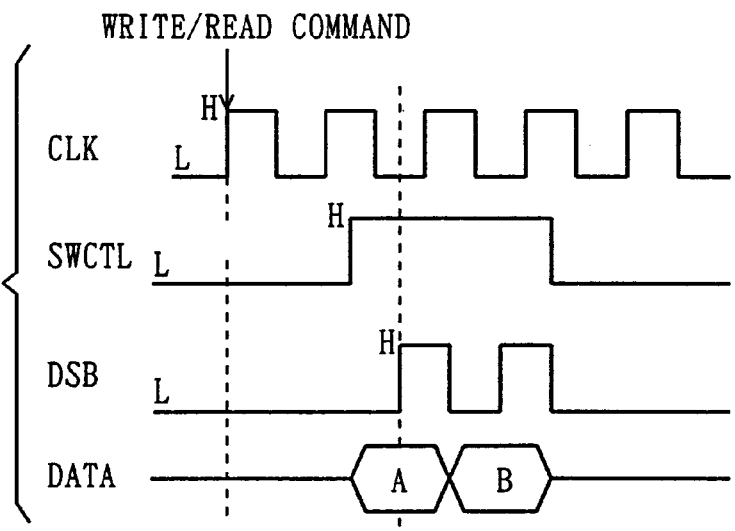
FIG. 22 is a timing chart for use in illustration of the operation of a memory module system according to the seventh embodiment of the invention.

The operation of this memory module system will be now described in conjunction with FIG. 22.

If memory module DIMMk is not selected by memory controller 1, an L level switch control signal is output from logic chip 92, as is the case with the first embodiment. As a result, all the switch transistors 14 and transistors 93 included in memory module DIMMk are turned off so that all the internal data buses 12 and internal data strobe bus 91 included in memory module DIMMk and external data bus 2 are disconnected. Transistor 94 is turned on, so that internal data strobe bus 94 is precharged to ground potential GND.

Then, if memory module DIMMk is selected by memory controller 1, as is the case with the first embodiment, switch control signal SWCTL output from logic chip 92 rises. In response to this, all the switch transistors 14 and transistors 93 included in memory module DIMMk are turned on, and all the internal data buses 12 and internal data strobe bus 91 included in memory module DIMMk and external data bus 2 are connected. At this time, transistor 94 is turned off.

Then, a data strobe signal DSB is applied to memory chip 11 included in memory module DIMMk through internal data strobe bus 91 from memory controller 1. Memory chip 11 writes/reads out a data signal to/from internal data bus 12 in response to data strobe signal DSB.

Subsequently, as is the case with the first embodiment, all the switch transistors 14 and transistor 93 included in memory module DIMMk are turned off once the input/output period of the data signal ends, and all the internal data buses 12 and internal data strobe bus 91 included in memory module DIMMk and external data bus 2 are disconnected. Transistor 94 is turned on, and data strobe bus 94 is precharged to ground potential GND.

Figure 23:
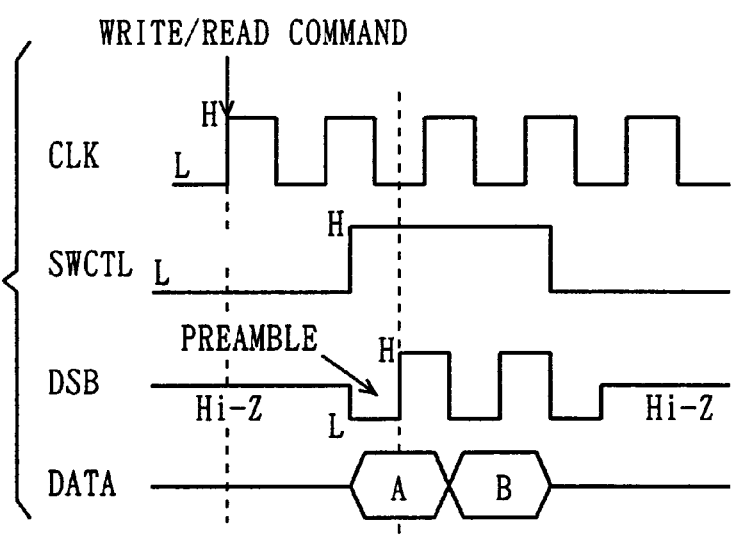
FIG. 23 is a timing chart for use in illustration of the operation of a memory module system using a conventional data strobe signal.

As in the foregoing, according to the seventh embodiment, the same effects as the first embodiment are brought about. In addition, since internal data strobe bus 91 and transistors 93 and 94 are provided in each of memory modules DIMMi, in data writing or reading to/from memory module DIMMk selected by memory controller 1, only the internal data strobe bus 91 included in the selected memory module DIMMk is connected to external data strobe bus 90. As a result, the necessity of maintaining internal data strobe buses in the memory modules other than a selected memory module in a high impedance state as practiced in the conventional module system shown in FIG. 23 is eliminated. If memory module DIMMk is selected, internal data strobe bus 91 included in memory module DIMMk is precharged to ground potential GND, i.e., the potential in a stand-by state for external data strobe bus 90. Thus, noises during connecting internal data strobe bus 91 and external data strobe bus 90 by switching of transistor 94 are reduced. The necessity of eeiiipreambling the potential of the internal data strobe bus included in the selected memory module from the high impedance state to the ground potential as practiced in the conventional memory module system as shown in FIG. 22 is eliminated.

Note that, although transistor 94 is connected to ground node GND, the transistor may be connected to power supply node Vcc.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A memory module system, comprising:
   a plurality of memory modules;
   a memory controller for selecting one of said memory modules;
   an external data bus provided commonly to said plurality of modules,
   said memory modules each including,
      a printed circuit board,
      a plurality of memory chips mounted on said printed circuit board,
      a plurality of internal data buses formed on said printed circuit board and corresponding to said plurality of memory chips, and each connected to a corresponding memory chip, and
      a plurality of first switching elements provided on said printed circuit board and corresponding to said plurality of internal data buses, and each connected between a corresponding internal data bus and said external data bus,
   said memory module system further comprising,
      a control circuit for turning on the plurality of first switching elements in a memory module selected by said memory controller, and turning off the plurality of first switching elements in the memory module other than the selected memory module wherein
         said control circuit includes a plurality of logic circuits corresponding to said plurality of memory modules, each for turning on the plurality of first switching elements in the corresponding memory module if said memory controller selects the corresponding memory module, and otherwise turning off the plurality of first switching elements,
         said memory controller applies a command signal representing a writing or reading mode to said plurality of logic circuits,
         said logic circuits each turning on the plurality of first switching elements in a corresponding memory module after a latency period since said command signal is received, and turning off said plurality of first switching elements after a burst length period since the turning on of said plurality of first switching elements.

2. The memory module system as recited in claim 1, wherein
   each of said logic circuits is mounted on said printed circuit board in a corresponding memory module.

3. The memory module system as recited in claim 1, wherein
   each of said logic circuits is built in at least one of a plurality of memory chips in a corresponding memory module.

4. A memory module system, comprising:
a plurality of memory modules;
a memory controller for selecting one of said memory modules;
an external data bus provided commonly to said plurality of modules,
said memory modules each including,
  a printed circuit board,
  a plurality of memory chips mounted on said printed circuit board,
  a plurality of internal data buses formed on said printed circuit board and corresponding to said plurality of memory chips, and each connected to a corresponding memory chip, and
  a plurality of first switching elements provided on said printed circuit board and corresponding to said plurality of internal data buses, and each connected between a corresponding internal data bus and said external data bus,
said memory module system further comprising,
  a control circuit for turning on the plurality of first switching elements in a memory module selected by said memory controller, and turning off the plurality of first switching elements in the memory module other than the selected memory module,
  said control circuit includes a plurality of logic circuits corresponding to said plurality of memory modules, each built in at least one of a plurality of memory chips in a corresponding memory module, for turning on a plurality of first switching elements in corresponding memory module and otherwise turning off the plurality of first switching elements, wherein
    said memory controller applies a command signal representing a writing or reading mode to said plurality of logic circuits,
said plurality of logic circuits each including,
  a write driver enable generation circuit for generating a write driver enable signal activated after a writing latency period since command signal representing the writing mode is received, and inactivated after a burst length period since the activation,
  an output enable generation circuit for generating an output enable signal activated after a column address strobe latency period since said command signal representing the reading mode is received, and inactivated after a burst length period since the activation, and
  an OR circuit receiving said write driver enable signal and said output enable signal, and
  each of the plurality of firs switching elements in each of said memory modules is a transistor having a gate to receive the output signal of the OR circuit in a corresponding logic circuit.

5. A memory module system, comprising:
a plurality of memory modules;
a memory controller for selecting one of said memory modules;
an external data bus provided commonly to said plurality of modules,
said memory modules each including,
  a printed circuit board,
  a plurality of memory chips mounted on said printed circuit board,
  a plurality of internal data buses formed on said printed circuit board and corresponding to plurality of memory chips, and each connected to a corresponding memory chip, and
  a plurality of first switching elements provided on said printed circuit board and corresponding to said plurality of internal data buses, and each connected between a corresponding internal data bus and said external data bus,
said memory module system further comprising,
  a control circuit for turning on the plurality of first switching elements in a memory module selected by said memory controller, and turning off the plurality of first switching elements in the memory module other than the selected memory module, wherein
    said memory controller applies, to said control circuit, a command signal representing a writing or reading mode and a data transfer start signal representing the start of data transfer,
  said control circuit including,
    a plurality of first logic circuits corresponding to said plurality of memory modules, each built in at least one of the plurality of memory chips in a corresponding memory module, for generating a writing/reading end signal representing the end of writing/reading data to/from said plurality of memory chips in response to said command signal representing the writing or reading mode, and
    a plurality of second logic circuits corresponding to said plurality of memory modules and each mounted on the printed circuit board in a corresponding memory module for turning on a plurality of first switching elements in the corresponding memory module in response to said data transfer start signal, and turning off the plurality of first switching elements in response to said writing/reading end signal.

6. The memory module system as recited in claim 5, wherein
said plurality of first logic circuits each include,
  a write driver enable generation circuit for generating a write driver enable signal activated after a writing latency period since said command signal representing the writing mode is received, and inactivated after a burst length period since the activation,
  an output enable signal generation circuit for generating an output enable signal activated after a column address strobe latency period since said command signal representing the read mode is received, and inactivated after a burst length period since the activation,
  an OR circuit receiving said write driver enable signal and said output enable signal, and
  an edge detection circuit for detecting an inactivation of an output signal from said OR circuit and generating a detection signal,
each of said second logic circuits includes a flip-flop circuit set in response to said data transfer start signal and reset in response to said detection signal,
each of the plurality of first switching elements in each of said memory modules includes a transistor having a gate to receive the output signal of a flip-flop circuit in a corresponding second logic circuit.

7. A memory module system, comprising:
a plurality of memory modules;
a memory controller for selecting one of said memory modules;
an external data bus provided commonly to said plurality of modules, said memory modules each including,
  a printed circuit board,
  a plurality of memory chips mounted on said printed circuit board,
  a plurality of internal data buses formed on said printed circuit board and corresponding to said plurality of memory chips, and each connected to a corresponding memory chip, and
  a plurality of first switching elements provided on said printed circuit board and corresponding to said plurality of internal data buses, and each connected between a corresponding internal data bus and said external data bus,
said memory module system further comprising,
  a control circuit for turning on the plurality of first switching elements in a memory module selected by said memory controller, and turning off the plurality of first switching elements in the memory module other than the selected memory module, further comprising an external data strobe bus provided commonly to said plurality of memory modules,
  said plurality of memory modules each including,
    an internal data strobe bus formed on said printed circuit board and provided commonly to said plurality of memory chips, and
    a second switching element provided on said printed circuit board and connected between said internal data strobe bus and said external data strobe bus,
    said control circuit turning on the second switching element in a memory module selected by said memory controller and turning off the second switching elements in the memory module other than the selected memory module.

8. The memory module system as recited in claim 7, wherein
  said plurality of memory modules each include a precharge circuit for precharging said internal data strobe bus to a ground potential or power supply potential when said second switching element is off.

* * * * *